US012585727B2

(12) United States Patent
Babokin et al.

(10) Patent No.: US 12,585,727 B2
(45) **Date of Patent: *Mar. 24, 2026**

(54) BIT MATRIX MULTIPLICATION

(71) Applicant: Intel Corporation, Santa Clara, CA (US)

(72) Inventors: Dmitry Y. Babokin, Santa Clara, CA (US); Kshitij A. Doshi, Tempe, AZ (US); Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,719

(22) Filed: Jun. 26, 2024

(65) Prior Publication Data

US 2025/0021621 A1      Jan. 16, 2025

Related U.S. Application Data

(63) Continuation of application No. 18/083,012, filed on Dec. 16, 2022, now Pat. No. 12,045,308, which is a
(Continued)

(51) Int. Cl.
| | |
|---|---|
| *G06F 17/16* | (2006.01) |
| *G06F 7/544* | (2006.01) |
| *G06F 9/30* | (2018.01) |

(52) U.S. Cl.
CPC ............ *G06F 17/16* (2013.01); *G06F 7/5443* (2013.01); *G06F 9/3001* (2013.01);
(Continued)

(58) Field of Classification Search
CPC .. G06F 7/5443; G06F 9/3001; G06F 9/30018; G06F 9/30029; G06F 9/30036; G06F 17/16
See application file for complete search history.

(56) References Cited

U.S. PATENT DOCUMENTS

| | | | |
|---|---|---|---|
| 4,202,039 | A | 5/1980 | Epenoy et al. |
| 4,937,775 | A | 6/1990 | Engeler et al. |
| | | (Continued) | |

FOREIGN PATENT DOCUMENTS

| | | |
|---|---|---|
| CN | 1774709 A | 5/2006 |
| CN | 1914592 A | 2/2007 |
| | (Continued) | |

OTHER PUBLICATIONS

Hilewitz, Yedidya, Cedric Lauradoux, and Ruby B. Lee, "Bit matrix multiplication in commodity processors", 2008 International Conference on Application-Specific Systems, Architectures and Processors, IEEE, 2008 (Year: 2008).*
(Continued)

*Primary Examiner* — Matthew D Sandifer
(74) *Attorney, Agent, or Firm* — Nicholson De Vos Webster & Elliott LLP

(57) ABSTRACT

Detailed are embodiments related to bit matrix multiplication in a processor. For example, in some embodiments a processor comprising: decode circuitry to decode an instruction have fields for an opcode, an identifier of a first source bit matrix, an identifier of a second source bit matrix, an identifier of a destination bit matrix, and an immediate; and execution circuitry to execute the decoded instruction to perform a multiplication of a matrix of S-bit elements of the identified first source bit matrix with S-bit elements of the identified second source bit matrix, wherein the multiplication and accumulation operations are selected by the operation selector and store a result of the matrix multiplication into the identified destination bit matrix, wherein S indicates a plural bit size is described.

23 Claims, 20 Drawing Sheets

VBMM8X64 DESTINATION, SOURCE 1, SOURCE 2/MEM, IMMEDIATE

Related U.S. Application Data continuation of application No. 17/156,119, filed on Jan. 22, 2021, now Pat. No. 11,568,022, which is a continuation of application No. 16/691,327, filed on Nov. 21, 2019, now Pat. No. 10,929,504, which is a continuation of application No. 15/721,529, filed on Sep. 29, 2017, now Pat. No. 10,534,838.

(52) U.S. Cl.
CPC ...... *G06F 9/30029* (2013.01); *G06F 9/30036* (2013.01); *G06F 9/30038* (2023.08)

(56) References Cited

U.S. PATENT DOCUMENTS

| | | | |
|---|---|---|---|
| 5,119,484 A | | 6/1992 | Fox |
| 5,170,370 A | * | 12/1992 | Lee .......................... G06F 17/16 |
| | | | 708/607 |
| 5,175,862 A | | 12/1992 | Phelps et al. |
| 5,442,577 A | | 8/1995 | Cohen |
| 5,583,804 A | | 12/1996 | Seal et al. |
| 5,675,526 A | | 10/1997 | Peleg et al. |
| 5,721,892 A | | 2/1998 | Peleg et al. |
| 5,784,305 A | | 7/1998 | Nadehara |
| 5,793,661 A | | 8/1998 | Dulong et al. |
| 5,838,984 A | | 11/1998 | Nguyen et al. |
| 5,862,067 A | | 1/1999 | Mennemeier et al. |
| 5,880,985 A | | 3/1999 | Makineni et al. |
| 5,936,872 A | | 8/1999 | Fischer et al. |
| 5,953,241 A | | 9/1999 | Hansen et al. |
| 5,983,253 A | | 11/1999 | Fischer et al. |
| 5,996,066 A | | 11/1999 | Yung |
| 6,014,684 A | | 1/2000 | Hoffman |
| 6,058,408 A | | 5/2000 | Fischer et al. |
| 6,144,980 A | | 11/2000 | Oberman |
| 6,202,141 B1 | | 3/2001 | Diefendorff et al. |
| 6,237,016 B1 | | 5/2001 | Fischer et al. |
| 6,272,512 B1 | | 8/2001 | Golliver et al. |
| 6,366,937 B1 | | 4/2002 | Shridhar et al. |
| 6,385,634 B1 | | 5/2002 | Peleg et al. |
| 6,470,370 B2 | | 10/2002 | Fischer et al. |
| 6,523,055 B1 | | 2/2003 | Yu et al. |
| 6,542,916 B1 | | 4/2003 | Hinds et al. |
| 6,609,140 B1 | | 8/2003 | Greene |
| 6,675,187 B1 | | 1/2004 | Greenberger |
| 6,823,353 B2 | | 11/2004 | Fischer et al. |
| 6,826,587 B1 | | 11/2004 | Montalvo et al. |
| 7,062,526 B1 | | 6/2006 | Hoyle |
| 7,072,929 B2 | | 7/2006 | Pechanek et al. |
| 7,219,212 B1 | | 5/2007 | Sanghavi et al. |
| 7,392,368 B2 | | 6/2008 | Khan et al. |
| 7,424,594 B2 | | 9/2008 | Pitsianis et al. |
| 7,428,566 B2 | | 9/2008 | Siu et al. |
| 7,546,329 B2 | | 6/2009 | Taunton |
| 7,546,330 B2 | | 6/2009 | Taunton |
| 7,555,514 B2 | | 6/2009 | Pedersen et al. |
| 7,593,978 B2 | | 9/2009 | Schulte et al. |
| 7,873,812 B1 | | 1/2011 | Mimar |
| 7,890,566 B1 | | 2/2011 | Zbiciak |
| 7,962,719 B2 | | 6/2011 | Pitsianis et al. |
| 8,229,991 B2 | | 7/2012 | Tran |
| 8,271,571 B2 | | 9/2012 | Matsuyama et al. |
| 8,325,403 B1 | | 12/2012 | Mesh et al. |
| 8,443,170 B2 | | 5/2013 | Wilder et al. |
| 8,458,442 B2 | | 6/2013 | Eichenberger et al. |
| 8,595,280 B2 | | 11/2013 | Symes et al. |
| 8,650,240 B2 | | 2/2014 | Eichenberger et al. |
| 8,904,152 B2 | | 12/2014 | Pitsianis et al. |
| 9,015,354 B2 | | 4/2015 | Pitsianis et al. |
| 9,104,510 B1 | | 8/2015 | Rub et al. |
| 9,118,631 B1 | | 8/2015 | Yung et al. |
| 9,411,583 B2 | | 8/2016 | Sair et al. |
| 9,465,611 B2 | | 10/2016 | Taunton et al. |
| 9,489,197 B2 | | 11/2016 | Rahman et al. |
| 9,519,460 B1 | | 12/2016 | Farooqui et al. |
| 9,778,905 B1 | | 10/2017 | Walke |
| 9,910,671 B2 | | 3/2018 | Li et al. |
| 10,180,820 B2 | | 1/2019 | Buchanan et al. |
| 11,074,073 B2 | | 7/2021 | Madduri et al. |
| 11,169,802 B2 | | 11/2021 | Valentine et al. |
| 11,243,765 B2 | | 2/2022 | Madduri et al. |
| 11,256,504 B2 | | 2/2022 | Madduri et al. |
| 2001/0032228 A1 | | 10/2001 | Fischer et al. |
| 2002/0004809 A1 | | 1/2002 | Golliver et al. |
| 2002/0169813 A1 | | 11/2002 | Pechanek et al. |
| 2003/0009502 A1 | | 1/2003 | Katayanagi |
| 2003/0014457 A1 | | 1/2003 | Desai et al. |
| 2003/0014458 A1 | | 1/2003 | Fischer et al. |
| 2003/0084083 A1 | | 5/2003 | Hull et al. |
| 2003/0088601 A1 | | 5/2003 | Pitsianis et al. |
| 2004/0073589 A1 | | 4/2004 | Debes et al. |
| 2004/0078404 A1 | | 4/2004 | Macy et al. |
| 2004/0117422 A1 | | 6/2004 | Debes et al. |
| 2004/0122887 A1 | | 6/2004 | Macy |
| 2004/0210616 A1 | | 10/2004 | Debes et al. |
| 2004/0221137 A1 | | 11/2004 | Pitsianis et al. |
| 2005/0071414 A1 | | 3/2005 | Taunton |
| 2005/0071415 A1 | | 3/2005 | Taunton |
| 2005/0078773 A1 | | 4/2005 | Astrachan |
| 2005/0172106 A1 | | 8/2005 | Ford et al. |
| 2005/0182813 A1 | | 8/2005 | Cho et al. |
| 2005/0193185 A1 | | 9/2005 | Taunton et al. |
| 2005/0198473 A1 | | 9/2005 | Ford |
| 2006/0015702 A1 | | 1/2006 | Khan et al. |
| 2007/0192399 A1 | | 8/2007 | Krithivasan et al. |
| 2007/0198815 A1 | | 8/2007 | Liu et al. |
| 2007/0239968 A1 | | 10/2007 | Moyer et al. |
| 2008/0046704 A1 | | 2/2008 | Tanaka et al. |
| 2008/0114826 A1 | | 5/2008 | Mejdrich et al. |
| 2008/0222486 A1 | | 9/2008 | Richardson et al. |
| 2008/0270768 A1 | | 10/2008 | Khan et al. |
| 2008/0288756 A1 | | 11/2008 | Johnson et al. |
| 2008/0301414 A1 | | 12/2008 | Pitsianis et al. |
| 2009/0055455 A1 | | 2/2009 | Matsuyama et al. |
| 2009/0077154 A1 | | 3/2009 | Matsuyama et al. |
| 2010/0017453 A1 | | 1/2010 | Held et al. |
| 2010/0274990 A1 | | 10/2010 | Wilder et al. |
| 2011/0040821 A1 | | 2/2011 | Eichenberger et al. |
| 2011/0040822 A1 | | 2/2011 | Eichenberger et al. |
| 2011/0106871 A1 | | 5/2011 | Symes et al. |
| 2011/0153994 A1 | | 6/2011 | Gopal et al. |
| 2011/0225224 A1 | | 9/2011 | Pitsianis et al. |
| 2012/0072704 A1 | | 3/2012 | Johnson et al. |
| 2012/0166511 A1 | | 6/2012 | Hiremath et al. |
| 2012/0284464 A1 | | 11/2012 | Padaki et al. |
| 2012/0284487 A1 | | 11/2012 | Saha et al. |
| 2013/0262547 A1 | | 10/2013 | Peleg et al. |
| 2013/0268794 A1 | | 10/2013 | Hancock |
| 2013/0275731 A1 | | 10/2013 | Sair et al. |
| 2014/0006469 A1 | | 1/2014 | Gueron et al. |
| 2014/0006755 A1 | | 1/2014 | Gueron et al. |
| 2014/0052968 A1 | | 2/2014 | Corbal et al. |
| 2014/0164467 A1 | | 6/2014 | Wolrich et al. |
| 2014/0164733 A1 | | 6/2014 | Jha |
| 2014/0188968 A1 | | 7/2014 | Kaul et al. |
| 2014/0189231 A1 | | 7/2014 | Maydan et al. |
| 2014/0195783 A1 | | 7/2014 | Karthikeyan et al. |
| 2014/0304493 A1 | | 10/2014 | Zhong et al. |
| 2014/0379774 A1 | | 12/2014 | Gupta et al. |
| 2015/0019842 A1 | | 1/2015 | Rahman et al. |
| 2015/0039856 A1 | | 2/2015 | Pitsianis et al. |
| 2015/0095623 A1 | | 4/2015 | Ermolaev et al. |
| 2015/0143078 A1 | | 5/2015 | Khan et al. |
| 2015/0149744 A1 | | 5/2015 | Pedersen |
| 2015/0277904 A1 | | 10/2015 | Espasa et al. |
| 2015/0339101 A1 | * | 11/2015 | Dupont De Dinechin ................. |
| | | | G06F 7/78 |
| | | | 708/620 |
| 2016/0140079 A1 | | 5/2016 | Kravitz et al. |
| 2016/0179470 A1 | | 6/2016 | Gueron et al. |
| 2016/0179523 A1 | * | 6/2016 | Ould-Ahmed-Vall ..................... |
| | | | G06F 9/30038 |
| | | | 712/221 |
| 2016/0179530 A1 | | 6/2016 | Ould-Ahmed-Vall et al. |

(56) References Cited

U.S. PATENT DOCUMENTS

| | | | |
|---|---|---|---|
| 2016/0188327 | A1 | 6/2016 | Ould-Ahmed-Vall et al. |
| 2016/0188341 | A1 | 6/2016 | Ould-Ahmed-Vall et al. |
| 2016/0224514 | A1 | 8/2016 | Moudgill et al. |
| 2016/0239300 | A1 | 8/2016 | Gueron et al. |
| 2016/0357563 | A1 | 12/2016 | Van Dalen et al. |
| 2017/0161069 | A1 | 6/2017 | Yokota et al. |
| 2018/0095758 | A1 | 4/2018 | Dubtsov et al. |
| 2018/0113708 | A1 | 4/2018 | Corbal et al. |
| 2019/0102193 | A1 | 4/2019 | Madduri et al. |
| 2019/0163472 | A1 | 5/2019 | Valentine et al. |
| 2019/0163473 | A1 | 5/2019 | Valentine et al. |

FOREIGN PATENT DOCUMENTS

| | | | |
|---|---|---|---|
| CN | 1965292 | A | 5/2007 |
| CN | 101076985 | A | 11/2007 |
| CN | 101238454 | A | 8/2008 |
| CN | 102053817 | A | 5/2011 |
| CN | 102197369 | A | 9/2011 |
| CN | 102520906 | A | 6/2012 |
| CN | 103023515 | A | 4/2013 |
| CN | 103218201 | A | 7/2013 |
| CN | 103383639 | A | 11/2013 |
| CN | 104011665 | A | 8/2014 |
| CN | 104040488 | A | 9/2014 |
| CN | 104137055 | A | 11/2014 |
| CN | 104321740 | A | 1/2015 |
| CN | 104350492 | A | 2/2015 |
| CN | 104951278 | A | 9/2015 |
| CN | 105117372 | A | 12/2015 |
| CN | 105264779 | A | 1/2016 |
| CN | 105302522 | A | 2/2016 |
| CN | 107003832 | A | 8/2017 |
| CN | 107003841 | A | 8/2017 |
| CN | 107003844 | A | 8/2017 |
| CN | 107003848 | A | 8/2017 |
| FR | 2793971 | A1 | 11/2000 |
| WO | 97/08608 | A1 | 3/1997 |
| WO | 2013/095552 | A1 | 6/2013 |
| WO | 2014/116712 | A1 | 7/2014 |
| WO | 2018/075052 | A1 | 4/2018 |

OTHER PUBLICATIONS

"5.6. Negative Values—Two's Complemen—CS160 Reader", archived from http://computerscience.chemeketa.edu, Jul. 2016, 3 pages.

Abu Taha M., et al., "A Practical One Way Hash Algorithm Based on Matrix Multiplication," International Journal of Computer Applications, vol. 23 (2), Jun. 2011, 5 pages.

Advisory Action, U.S. Appl. No. 17/380,930, Mar. 6, 2023, 2 pages.

Agrawal D. P., et al., "On Multiple Operand Addition of Signed Binary Numbers," IEEE Transactions on Computers, vol. C-27, No. 11, Nov. 1978, pp. 1068-1070.

Bacon D., "CSEO 5901v: Quantum Computing," Jun. 29, 2005, 64 pages.

Bertin et al., "Complex Pisot Numbers in Algebraic Number Fields", C. R. Acad. Sci. Paris, Ser. I, vol. 353, Sep. 2015, pp. 965-967.

Chen et al., "Design of Multiplier based on Instruction Set of ARMv4T Architecture", Application Research of Computers, vol. 28, No. 2, Feb. 2011, pp. 587-590 (only Abstract in English).

Corrected Notice of Allowability, U.S. Appl. No. 17/672,504, Jan. 20, 2023, 2 pages.

Dolmatov V., et al., "Gost R 34.Nov. 2012: Hash Function," Aug. 2013, 64 pages.

Ex Parte Quayle Action, U.S. Appl. No. 15/721,145, Jan. 13, 2020, 7 pages.

Ex Parte Quayle Action, U.S. Appl. No. 15/721,145, Jun. 10, 2021, 7 pages.

Ex Parte Quayle Action, U.S. Appl. No. 15/721,145, Sep. 6, 2019, 9 pages.

Final Office Action for U.S. Appl. No. 15/721,313, Mailed Sep. 10, 2019, 28 pages.

Final Office Action for U.S. Appl. No. 15/721,448, mailed Feb. 11, 2020, 19 pages.

Final Office Action for U.S. Appl. No. 15/721,616, mailed Oct. 28, 2019, 28 pages.

Final Office Action for U.S. Appl. No. 15/721,627, Oct. 28, 2019, 29 pages.

Final Office Action from U.S. Appl. No. 15/721,627, Oct. 28, 2019, 29 pages.

Final Office Action from U.S. Appl. No. 15/721,529, Mar. 21, 2019, 10 pages.

Final Office Action, U.S. Appl. No. 15/721,225, Jan. 14, 2020, 7 pages.

Final Office Action, U.S. Appl. No. 15/721,313, Sep. 10, 2019, 28 pages.

Final Office Action, U.S. Appl. No. 15/721,448, Feb. 11, 2020, 19 pages.

Final Office Action, U.S. Appl. No. 15/721,448, Jan. 26, 2021, 12 pages.

Final Office Action, U.S. Appl. No. 15/721,458, May 3, 2019, 17 pages.

Final Office Action, U.S. Appl. No. 15/721,529, Mar. 21, 2019, 10 pages.

Final Office Action, U.S. Appl. No. 15/721,616, Oct. 28, 2019, 28 pages.

Final Office Action, U.S. Appl. No. 15/721,627, Oct. 28, 2019, 29 pages.

Final Office Action, U.S. Appl. No. 17/380,930, Dec. 27, 2022, 8 pages.

First Office Action, CN App. No. 201810996131.8, Oct. 16, 2024, 13 pages (6 pages of English Translation and 7 pages of Original Document).

Hamamreh R., et al., "Hash Algorithm for Data Integrity Based on Matrix Combination," The 14th International Arab Conference on Information Technology (ACIT'2013), Feb. 2014, 5 pages.

Han, "Design Verification and Implementation of the IMAC Component in M-DSP", National University of Defense Technology, Thesis, Mar. 2015, 77 pages.

Hilewitz et al., "Advanced Bit Manipulation Instruction Set Architecture," Princeton University, Nov. 2006, 17 pages.

Hilewitz et al., "Bit Matrix Multiplication in Commodity Processors", 2008 IEEE International Conference on Application-Specific Systems, Architectures and Processors, 2008, pp. 7-12.

Igor Kholodov, "CIS-77 Introduction to Computer Systems, Instruction Format Design", retrieved from URL: http://www.c-jump.com/CIS77/CPU/IsaDesign/lecture.html, Jan. 23, 2010, 18 pages.

Lemuet, C., et al., "The Potential Energy Efficiency of Vector Acceleration", In: Proceedings of the 2006 ACM/IEEE Conference on Supercomputing, Nov. 11, 2006, 10 pages.

Li, "Study and Implementation of Optimized Methods of Complex Multiplication", Electronic Design Engineering, vol. 21, No. 13, Jul. 5, 2013, 4 pages (only Abstract in English).

Li, Li-Jun, "Study and Implementation of Optimized Methods of Complex Multiplication", Electronic Design Engineering, vol. 21, No. 3, Jul. 2013, 4 pages.

Mahajan N.V., et al., "Simple Computation of DIT FFT," International Journal of Advanced Research in Computer Science and Software Engineering, May 2014, vol. 4 (5), pp. 353-356.

Mathcentre., "The Complex Conjugate", Available Online at <http://www.mathcentre.ac.uk/resources/sigma%20complex%20number"/20leaflets/sigma-complex6-2009-1.pdf>, 2009, 1 page.

Non-Final Office Action for U.S. Appl. No. 15/721,225, Aug. 13, 2019, 20 pages.

Non-Final Office Action from U.S. Appl. No. 15/721,225, Aug. 13, 2019, 20 pages.

Non-Final Office Action, U.S. App. No. 15/721,145, Apr. 4, 2019, 17 pages.

Non-Final Office Action, U.S. Appl. No. 15/721,225, Aug. 13, 2019, 20 pages.

Non-Final Office Action, U.S. Appl. No. 15/721,261, Mar. 15, 2019, 10 pages.

Non-Final Office Action, U.S. Appl. No. 15/721,313, Apr. 16, 2019, 18 pages.

(56) References Cited

OTHER PUBLICATIONS

First Office Action, CN App. No. 201810994549.5, Feb. 14, 2025, 21 pages (10 pages of English Translation and 11 pages of Original Document.

First Office Action, CN App. No. 201810997047.8, Dec. 31, 2024, 19 pages (09 pages of English Translation and 10 pages of Original Document.

Gu Rongrong, "Design of high performance reconfigurable multiply-add unit", 2010 Issue 2 (Issue 126), 3 pages.

Khouja et al., "Low Power Implementation of Decimation Filters in Multistandard Radio Receiver Using Optimized Multiplication-Accumulation Unit", IEEE, 2007, pp. 1183-1186.

MMX, "FingerPrint Image Identification Algorithms Based on MMX Technology"2007, 65 Pages.

Notice of Allowance, CN App. No. 201810996655.7, Mar. 26, 2025, 05 pages (03 pages of English Translation and 02 pages of Original Document).

Notice of Allowance, CN App. No. 201811130761.3, Mar. 24, 2025, 07 pages (03 pages of English Translation and 04 pages of Original Document).

Second Office Action, CN App. No. 201810996131.8, Feb. 21, 2025, 10 pages (06 pages of English Translation of Search Report and 04 pages of Original Document.

Zhang et al., "A versatile multiply-accumulator design optimized for speed", vol. 6 No. Jul. 13, 2006, 4 pages.

Notice of Allowance, U.S. Appl. No. 15/721,599, Jun. 12, 2020, 5 pages.

Notice of Allowance, U.S. Appl. No. 16/672,203, Dec. 17, 2020, 9 pages.

Notice of Allowance, U.S. Appl. No. 16/691,327, Oct. 21, 2020, 7 pages.

Notice of Allowance, U.S. Appl. No. 17/027,230, Jul. 12, 2023, 7 pages.

Notice of Allowance, U.S. Appl. No. 17/027,230, Oct. 19, 2022, 7 pages.

Notice of Allowance, U.S. App. No. 17/156, 119, Sep. 16, 2022, 9 pages.

Notice of Allowance, U.S. Appl. No. 17/226,986, Oct. 17, 2022, 9 pages.

Notice of Allowance, U.S. Appl. No. 17/672,504, Apr. 24, 2023, 9 pages.

Notice of Allowance, U.S. Appl. No. 17/672,504, Jan. 17, 2023, 10 pages.

Notice of Allowance, U.S. Appl. No. 18/083,012, Mar. 25, 2024, 5 pages.

Office Action, CN App. No. 201810996983.7, Oct. 29, 2024, 18 pages (9 pages of English Translation and 9 pages of Original Document).

Office Action, CN App. No. 201810998112.9, Oct. 24, 2024, 12 pages (6 pages of English Translation and 6 pages of Original Document).

Office Action, CN App. No. 201811130708.3, Oct. 31, 2024, 17 pages (8 pages of English Translation and 9 pages of Original Document).

Restriction Election Requirement, U.S. Appl. No. 15/721,225, Jan. 9, 2019, 6 pages.

Roth, A., et al., "CIS 371: Digital Systems Organization and Design", Unit 1: Instruction Set Architectures, Jan. 25, 2011, 20 pages.

Ryan T., "How Do You Find the Product of 7-2i and its Conjugate ?: from Socratic", Available Online at <https://socratic.org/questions/how-do-you-find-the-product-of-7-2i-and-its-conjugate>, Dec. 24, 2015, 1 page.

Slade G. W., "The Fast Fourier Transform in Hardware: A Tutorial Based on an FPGA Implementation", Mar. 21, 2013, pp. 1-26.

Slade G. W., "The Fast Fourier Transfonrn in Hardware: A Tutorial Based on an FPGA Implementation," Mar. 21, 2013, pp. 1-26.

Stack Overflow, "Binary Matrix Multiplication Bit Twiddling Hack", Available Online at <http://stackoverflow.com/questions/18447321/binary-matrix-multiplication-bit-twiddling-hack>, Aug. 26, 2013, 7 pages.

Van Amstel D., "Efficient and Scalable Bit-Matrix Multiplication in Bit-Slice Fonrnat," ACM SAC 2012, Mar. 2012, 6 pages.

Van Amstel D., "Efficient and Scalable Bit-Matrix Multiplication in Bit-Slice Format," ACM SAC 2012, Mar. 2012, 6 pages.

Van, Zee F.G., et al., "Implementing High-Performance Complex Matrix Multiplication via the 3m and 4m Methods," ACM Transactions on Mathematical Software, 2016, pp. 0:1-0:36.

Yan et al., "Singular Value Decomposition Algorithm of Rectangular Complex Matrix Based on FPGA", Journal of University of Electronic Science and Technology of China, vol. 44, No. 4, Jul. 2015, pp. 481-486 (only Abstract in English).

Yang, "Based on 0.35μm SiGe Process for Low-Power Complex Number Multiplier ASIC Chip Design", Master Dissertation, University of Electronic Science and Technology of China, Jun. 15, 2007, 86 pages.

Yuan, et al., "Optimization Methodology for the Number of Additions in Multiplier", Journal of Xidian University, vol. 40, No. 3, Jun. 2013, pp. 102-108 (only Abstract in English).

Zhou et al., "An Architecture of Dynamically Reconfigurable Processing Unit(RPU)", IEEE,Conference on Parallel Processing Workshops (ICPPW 2007), Sep. 14, 2007, 5 pages.

Non-Final Office Action, U.S. Appl. No. 15/721,448, Aug. 25, 2020, 46 pages.

Non-Final Office Action, U.S. Appl. No. 15/721,448, Jun. 19, 2019, 13 pages.

Non-Final Office Action, U.S. Appl. No. 15/721,448, Nov. 16, 2018, 17 pages.

Non-Final Office Action, U.S. Appl. No. 15/721,448, Jun. 11, 2021, 44 pages.

Non-Final Office Action, U.S. Appl. No. 15/721,458, Dec. 5, 2018, 18 pages.

Non-Final Office Action, U.S. Appl. No. 15/721,464, May 15, 2019, 22 pages.

Non-Final Office Action, U.S. Appl. No. 15/721,529, Nov. 19, 2018, 10 pages.

Non-Final Office Action, U.S. Appl. No. 15/721,616, Mar. 21, 2019, 27 pages.

Non-Final Office Action, U.S. Appl. No. 15/721,627, Mar. 21, 2019, 27 pages.

Non-Final Office Action, U.S. Appl. No. 16/672,203, May 15, 2020, 6 pages.

Non-Final Office Action, U.S. Appl. No. 16/691,327, Jun. 1, 2020, 6 pages.

Non-Final Office Action, U.S. Appl. No. 17/027,230, Jun. 27, 2022, 6 pages.

Non-Final Office Action, U.S. Appl. No. 17/226,986, May 10, 2022, 10 pages.

Non-Final Office Action, U.S. Appl. No. 17/380,930, Jul. 27, 2022, 10 pages.

Non-Final Office Action, U.S. Appl. No. 18/083,012, Oct. 26, 2023, 9 pages.

Notice of Allowance and Fees Due (PTOL-85) Mailed on Dec. 17, 2020 for U.S. Appl. No. 16/672,203.

Notice of Allowance for U.S. Appl. No. 15/721,261, Aug. 14, 2019, 8 pages.

Notice of Allowance for U.S. Appl. No. 15/721,261, Nov. 12, 2019, 5 pages.

Notice of Allowance from U.S. Appl. No. 15/721,261, Nov. 12, 2019, 6 pages.

Notice of Allowance from U.S. Appl. No. 15/721,529, Sep. 5, 2019, 5 pages.

Notice of Allowance received for U.S. Appl. No. 15/721,529, Sep. 5, 2019, 5 pages.

Notice of Allowance, U.S. Appl. No. 15/721,145, Dec. 9, 2021, 2 pages.

Notice of Allowance, U.S. Appl. No. 15/721,145, Jun. 26, 2020, 7 pages.

Notice of Allowance, U.S. Appl. No. 15/721, 145, Oct. 13, 2021, 7 pages.

(56)　　　　　References Cited

OTHER PUBLICATIONS

Notice of Allowance, U.S. Appl. No. 15/721,225, Apr. 2, 2021, 8 pages.
Notice of Allowance, U.S. Appl. No. 15/721,261, Aug. 14, 2019, 8 pages.
Notice of Allowance, U.S. Appl. No. 15/721,261, Nov. 12, 2019, 6 pages.
Notice of Allowance, U.S. Appl. No. 15/721,313, Jan. 22, 2020, 10 pages.
Notice of Allowance, U.S. Appl. No. 15/721,412, Feb. 13, 2019, 8 pages.
Notice of Allowance, U.S. Appl. No. 15/721,412, Jun. 1, 2020, 5 pages.
Notice of Allowance, U.S. Appl. No. 15/721,448, Nov. 22, 2021, 2 pages.
Notice of Allowance, U.S. Appl. No. 15/721,448, Oct. 27, 2021, 9 pages.
Notice of Allowance, U.S. Appl. No. 15/721,459, Mar. 6, 2019, 5 pages.
Notice of Allowance, U.S. Appl. No. 15/721,459, Feb. 13, 2019, 9 pages.
Notice of Allowance, U.S. Appl. No. 15/721,459, Jun. 15, 2020, 5 pages.
Notice of Allowance, U.S. Appl. No. 15/721,464, Aug. 29, 2019, 24 pages.
Notice of Allowance, U.S. Appl. No. 15/721,464, Jan. 8, 2020, 5 pages.
Notice of Allowance, U.S. Appl. No. 15/721,529, Sep. 5, 2019, 5 pages.
Notice of Allowance, U.S. Appl. No. 15/721,599, Feb. 28, 2019, 8 pages.
Final Office Action, U.S. Appl. No. 17/589,428, Oct. 8, 2025, 14 pages.
Jian et al., "High-Speed Floating Point for FPGA Implementation Research of FFT", Microcomputers and Applications, vol. 31, No. 14, 2012, 4 pages.
Li et al., "Parallel Analysis of Video Digital Signal Processing Chip XY-VDSP", Journal of Xi'an University of Posts and Telecommunications, vol. 8, No. 3, Jul. 2003, 5 pages.
Lian et al., "Compiling Optimization Method of Address Immediate Value Based on C-SKY CPU", Computer Engineering, vol. 42, No. 1, Jan. 2016, 5 pages.
Liu et al., "Efficient Min-Sum Decoding of LDPC Codes Based on Layer Schedules", 2012 IEEE International Conference on Information Science and Technology (ICIST), Mar. 23-25, 2012, pp. 882-885.
Massachusetts Institute of Technology, "6.341: Discrete-Time Signal Processing", Department of Electrical Engineering and Computer Science, OpenCourseWare 2006, Lecture 15: The Discrete Fourier Transform (DFT), 2006, 6 pages.
Meijuan, Liang, "Research and Implementation of H.264 Video Decoding Algorithm Based on DSP", Information Technology, Issue 11, Nov. 15, 2014, 69 pages.
Non-Final Office Action, U.S. Appl. No. 17/589,428, May 6, 2025, 25 pages.
Notice of Allowance, CN App. No. 201810994549.5, Sep. 1, 2025, 7 pages (3 pages of English Translation and 4 pages of Original Document).
Notice of Allowance, CN App. No. 201810996131.8, Apr. 30, 2025, 5 pages (3 pages of English Translation and 2 pages of Original Document).
Notice of Allowance, CN App. No. 201810996983.7, Mar. 28, 2025, 7 pages (3 pages of English Translation and 4 pages of Original Document).
Notice of Allowance, CN App. No. 201811130708.3, Jun. 20, 2025, 5 pages (3 pages of English Translation and 2 pages of Original Document).
Notice of Allowance, CN App. No. 201811131677.3, Mar. 20, 2025, 5 pages (3 pages of English Translation and 2 pages of Original Document).
Office Action, CN App. No. 201810997047.8, May 16, 2025, 16 pages (8 pages of English Translation and 8 pages of Original Document).
Office Action, CN App. No. 201810997182.2, Dec. 25, 2024, 19 pages of Original Document only.
Office Action, CN App. No. 201811131677.3, Oct. 31, 2024, 6 pages of Original Document only.
Office Action, CN App. No. 201811131786.5, Sep. 30, 2024, 6 pages of Original Document only.
Office Action, CN App. No. 202111085257.8, Jun. 28, 2023, 6 pages (2 pages of English Translation and 4 pages of Original Document).

* cited by examiner

VBMM8X64 DESTINATION, SOURCE 1, SOURCE 2/MEM, IMMEDIATE

VBMM8X64X64 DESTINATION, SOURCE 1, SOURCE2 (MEM), IMMEDIATE

VBMM8X64X64 DESTINATION, SOURCE 1 (MEM), SOURCE, IMMEDIATE

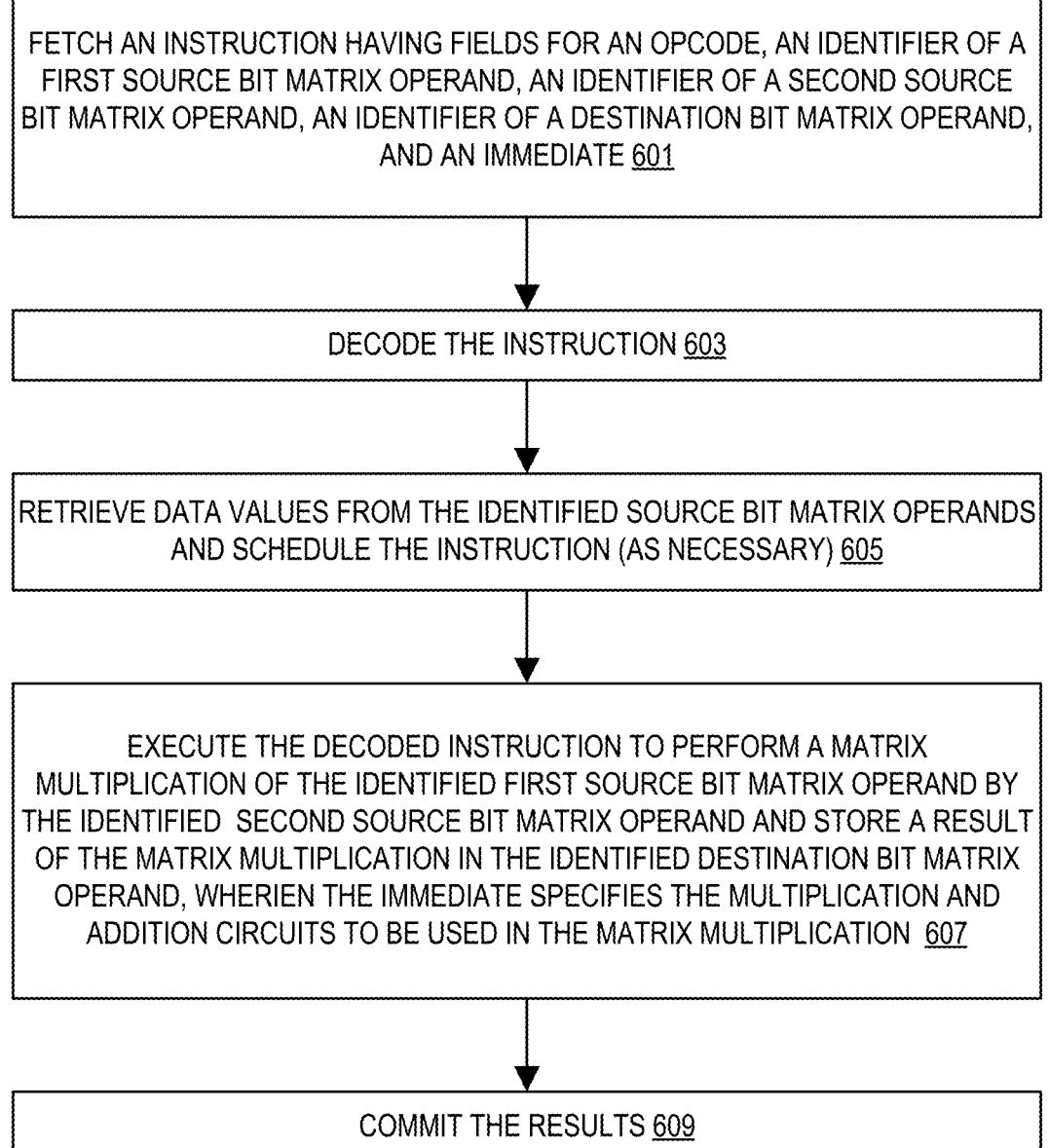

FETCH AN INSTRUCTION HAVING FIELDS FOR AN OPCODE, AN IDENTIFIER OF A FIRST SOURCE BIT MATRIX OPERAND, AN IDENTIFIER OF A SECOND SOURCE BIT MATRIX OPERAND, AN IDENTIFIER OF A DESTINATION BIT MATRIX OPERAND, AND AN IMMEDIATE 601

DECODE THE INSTRUCTION 603

RETRIEVE DATA VALUES FROM THE IDENTIFIED SOURCE BIT MATRIX OPERANDS AND SCHEDULE THE INSTRUCTION (AS NECESSARY) 605

EXECUTE THE DECODED INSTRUCTION TO PERFORM A MATRIX MULTIPLICATION OF THE IDENTIFIED FIRST SOURCE BIT MATRIX OPERAND BY THE IDENTIFIED SECOND SOURCE BIT MATRIX OPERAND AND STORE A RESULT OF THE MATRIX MULTIPLICATION IN THE IDENTIFIED DESTINATION BIT MATRIX OPERAND, WHERIEN THE IMMEDIATE SPECIFIES THE MULTIPLICATION AND ADDITION CIRCUITS TO BE USED IN THE MATRIX MULTIPLICATION 607

COMMIT THE RESULTS 609

FIG. 6

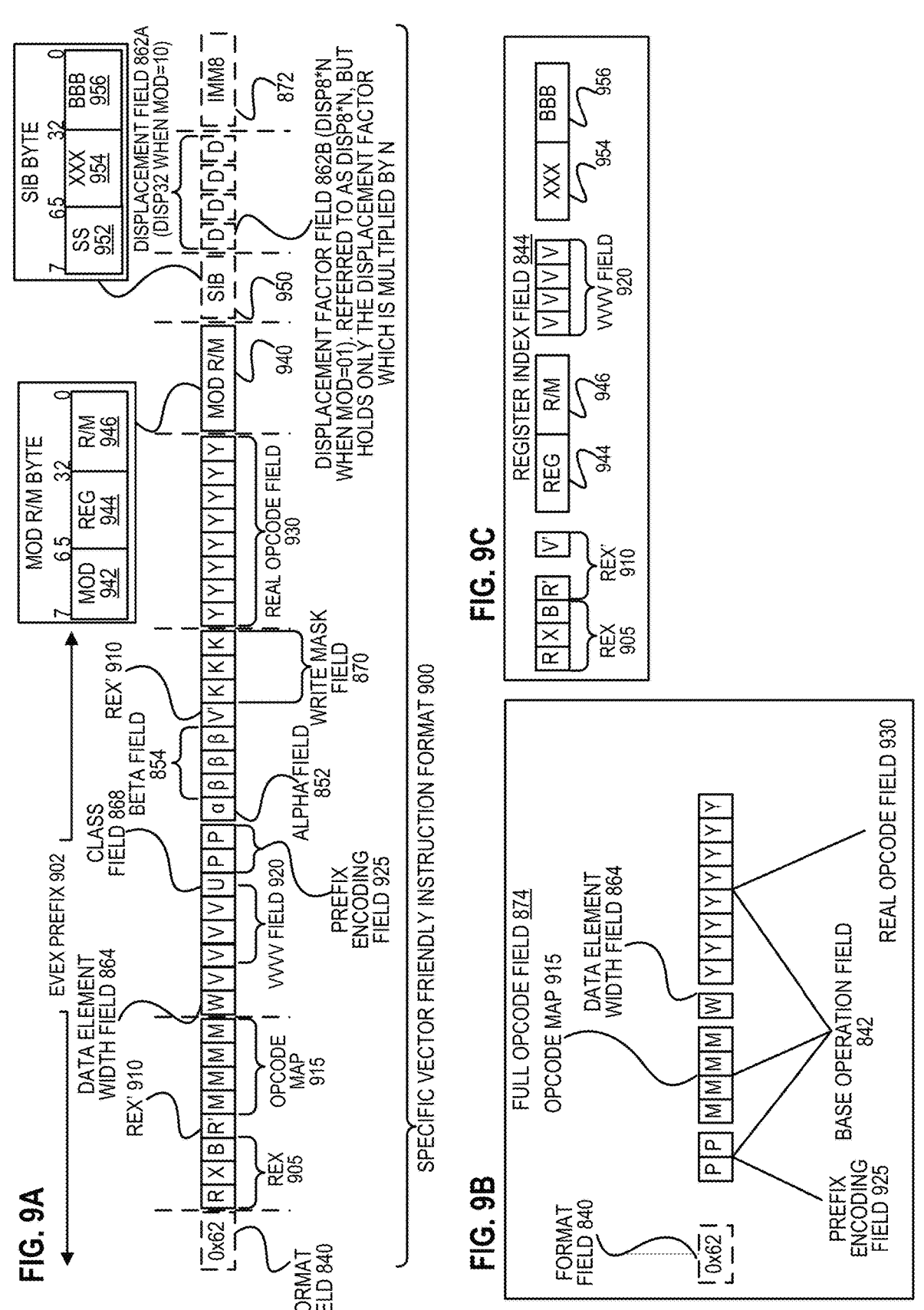

BIT MATRIX MULTIPLICATION

BACKGROUND

Many instances of bioinformatics, software defined radio, imaging and cryptology applications (several encryption algorithms, secure hashing, etc.) use bit matrix-multiplication (BMM). Several operations can be more efficient when implemented as BMM such as S-boxes, bit permutations, Hadamard transform, bit-wise neural networks, Galois-field multiplications (used in cryptography and channel coding), etc. as well as for bit manipulations.

BRIEF DESCRIPTION OF THE DRAWINGS

The present invention is illustrated by way of example and not limitation in the figures of the accompanying drawings, in which like references indicate similar elements and in which:

FIG. 6 illustrates an embodiment of method performed by a processor to process a BMM instruction;

FIG. 9A is a block diagram illustrating an exemplary specific vector friendly instruction format according to embodiments of the invention;

FIG. 9B is a block diagram illustrating the fields of the specific vector friendly instruction format 900 that make up the full opcode field 874 according to one embodiment of the invention;

FIG. 9C is a block diagram illustrating the fields of the specific vector friendly instruction format 900 that make up the register index field 844 according to one embodiment of the invention;

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Typically, processor cores are optimized around the processing of words and not bits. As such, complex bit-level operations are typically not as well supported.

Detailed herein are embodiments of BMM instructions and their execution. Depending upon the implementation, the instructions detailed herein may use general purpose registers (e.g., 64-bit GPRs), packed data (sometimes called vector, or single-instruction multiple data (SIMD)) registers or register blocks, or memory based (e.g., 64-bit, 512-bit, 4,096-bit, etc.) operands. These instructions are improvements to a computer itself as they provide support for BMM which has not previously been possible. In particular, an execution of a BMM instruction causes a bit matrix multiplication of two source matrices to be performed wherein the particular circuitry used in the multiply and addition aspects are selected via the instruction. In some embodiments, element-by-element multiply is performed using an AND and term-by-term sum using an exclusive OR (XOR). As detailed below, embodiments of the BMM instructions detailed herein have selectable multiply and/or sum circuitry. For example, an immediate (or other operand(s)) specifies what the multiply and add circuitry that will be used in the BMM. Exemplary multiplication (⊗) circuits include, but are not limited to: bitwise AND, NAND, XOR, XNOR, and/or NOR. Exemplary addition ($\oplus$) circuits include, but are not limited to: bitwise XOR, NOR, OR, XNOR; majority (=1 if majority is 1) and minority. In the discussion below, brackets [ ] to denote value of specific bit, $\otimes$ denotes a bit-field multiplication (e.g., AND) and $\oplus$ denotes a bit accumulation (e.g., XOR).

Figure 1:
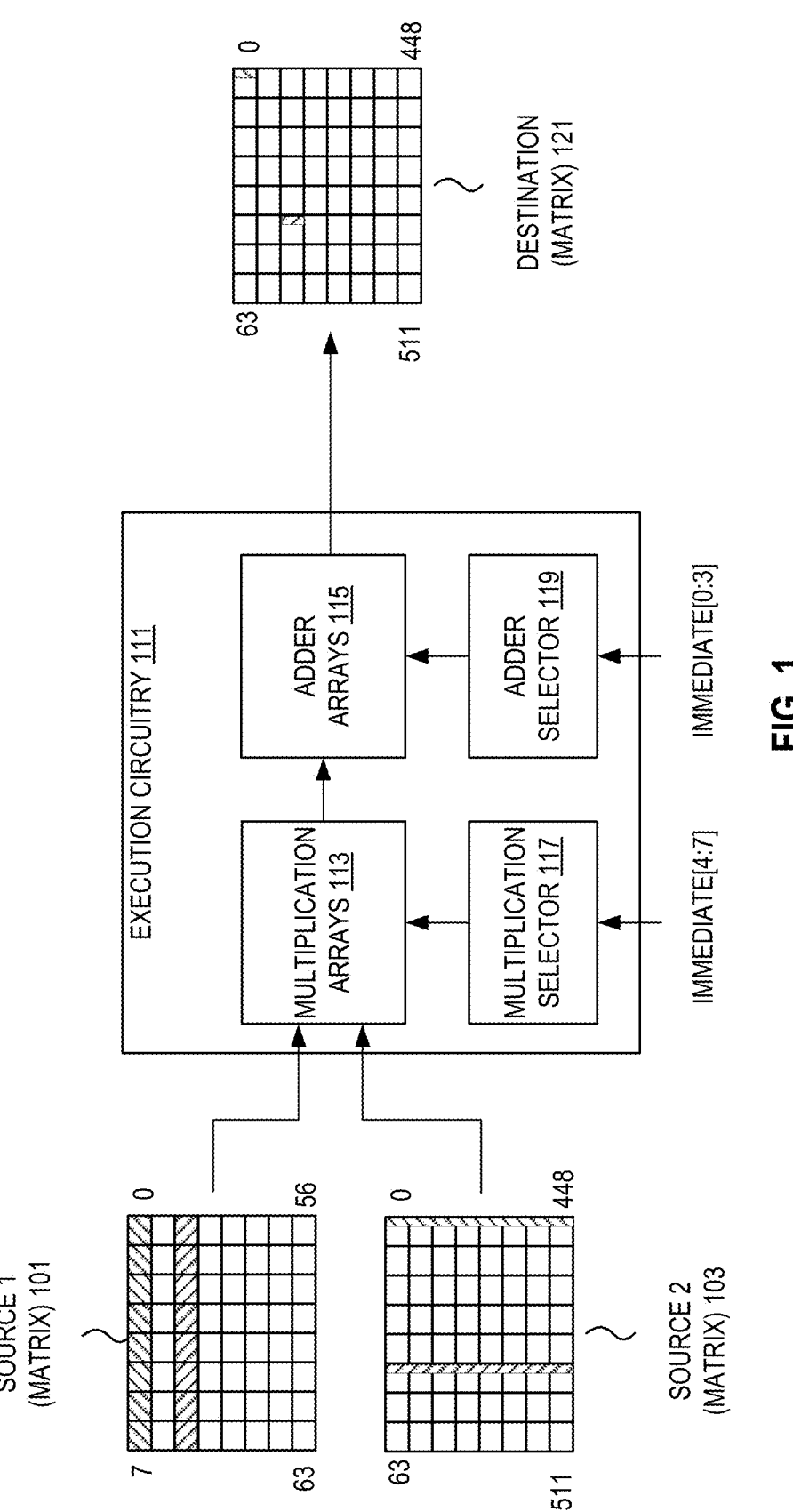
FIG. 1 illustrates an embodiment of a selected portion of execution of a BMM instruction having sources of an 8×8 bit matrix with an 8×64 bit matrix.

FIG. 1 illustrates an embodiment of a selected portion of execution of a BMM instruction having sources of an 8×8 bit matrix with an 8×64 bit matrix. The format of this BMM instruction includes fields for an opcode ("VBMM8×64" is the opcode mnemonic in this illustration), a first source bit matrix operand identifier (shown as "SOURCE 1"), a second source bit matrix operand identifier (shown as "SOURCE 2/MEM"), an immediate, and a destination bit matrix operand identifier (shown as "DESTINATION").

The two source operand fields represent a location of a first source bit matrix operand 101 and a second bit source matrix operand 103. These locations may be a memory location (e.g., an address in memory such as a disk or RAM) or one or more registers.

In this illustration, the first source bit matrix operand 101 is an 8×8 bit matrix. In some embodiments of BMM instructions, an 8×8 bit matrix is stored in memory or in one or more registers as a sequence of 8 8-bit rows, starting with row 0. As such, access to bit located in row I, column J of matrix M would be: M[I,J]=M[I*8+J], and if stored in memory: (M[I]>>J) &1.

In this illustration, the second source bit matrix operand 101 is an 8×64 bit matrix. In some embodiments, an 8×64 bit matrix (8 rows of 64 bits) is stored in memory or one or more registers as a sequence of 64-bit rows starting with row 0. As such, access to bit located in row I, column J of matrix M would be: M[I,J]=M[I*64+J] (this is bit reference, not byte), or differently, to get value of bit M[I,J], stored in memory some would use (M[I*]>>J)&1, assuming byte addressing.

The destination bit matrix operand field represents a destination bit matrix operand 121 which stores the result of the bit matrix multiplication operation. As detailed earlier, this operand 121 may be stored in a register (e.g., 512-bit register), a collection of registers, or locations in memory.

As shown, execution circuity 111 includes a plurality of multiplication arrays 113 and a plurality of adder arrays 115. The immediate of the instruction is used to select a type of multiplication array 113 and a type of adder array 115. For example, in some embodiments, bits 4:7 of an 8-bit immediate are used by multiplication selector 117 to select the multiplication circuitry from the plurality of multiplication arrays 113. For example, imm8 [4:7] selects from XOR, AND, OR, NOR, NAND, and XNOR circuits for multiplication. In some embodiments, bits 0:3 of an 8-bit immediate are used by adder selector 119 to select the multiplication circuitry from the plurality of adder arrays 115. For example, imm8 [0:3] selects from XOR, AND, OR, NOR, and XNOR circuits for addition. Any particular arrangement may be used to signal the selection, however, an exemplary table of selections is below:

TABLE 1

| IMMEDIATE[0:3] | ADDER CIRCUIT(S) SELECTED | IMMEDIATE[4:7] | MULTIPLIER CIRCUIT(S) SELECTED |
|---|---|---|---|
| 0000 | XOR | 0000 | XOR |
| 0001 | AND | 0001 | AND |
| 0010 | OR | 0010 | OR |
| 0011 | NOR | 0011 | NOR |
| 0100 | XNOR | 0100 | XNOR |

TABLE 1-continued

| IMMEDIATE[0:3] | ADDER CIRCUIT(S) SELECTED | IMMEDIATE[4:7] | MULTIPLIER CIRCUIT(S) SELECTED |
|---|---|---|---|
| 0101 | | 0101 | NAND |

The illustration shows two positions of the calculated result (DESTINATION[0] and DESTINATION[168]). DESTINATION[0] is calculated as follows: DEST[0*64+0]=SRC1[0*8+0]$\otimes$SRC2[0*64+0]$\oplus$ SRC1[0*8+1]$\otimes$SRC2[1*64+0]$\oplus$ . . . $\oplus$SRC1[0*8+7]$\otimes$SRC2[7*64+0]. DESTINATION[168] is calculated as follows: DEST[2*64+40]= SRC1[2*8+0]$\otimes$SRC2[0*64+40]$\oplus$SRC1[2*8+1]$\otimes$SRC2[1*64+40]$\oplus$ $\oplus$SRC1[2*8+7]$\otimes$SRC2[7*64+40].

Figure 2:
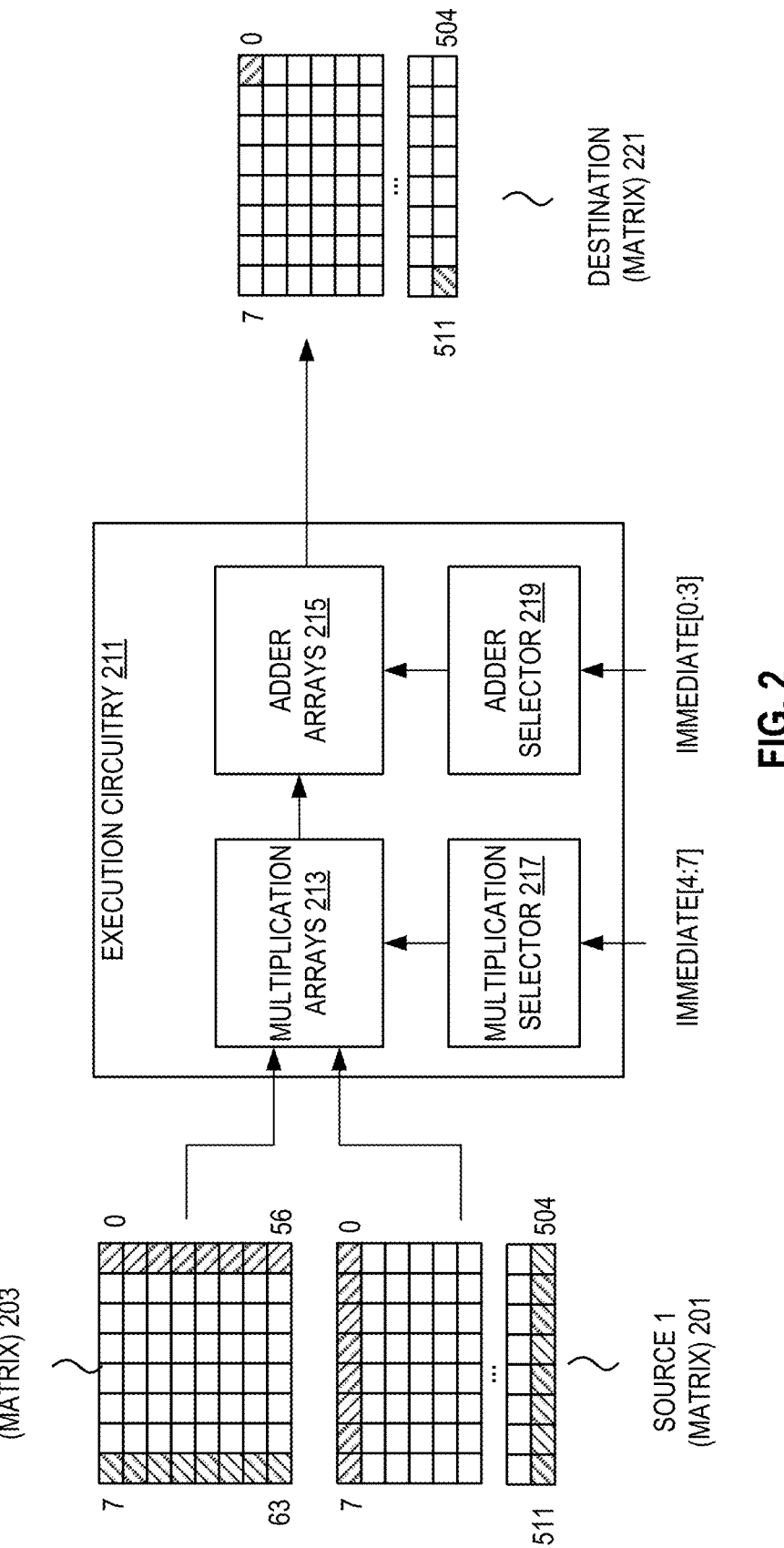
FIG. 2 illustrates an embodiment of a selected portion of execution of a BMM instruction having sources of an 64×8 bit matrix with an 8×8 bit matrix.

FIG. 2 illustrates an embodiment of a selected portion of execution of a BMM instruction having sources of an 64×8 bit matrix with an 8×8 bit matrix. The format of this BMM instruction includes fields for an opcode ("VBMM64×8" is the opcode mnemonic in this illustration), a first source bit matrix operand identifier (shown as "SOURCE 1"), a second source bit matrix operand identifier (shown as "SOURCE 2/MEM"), an immediate, and a destination bit matrix operand identifier (shown as "DESTINATION").

The two source operand fields represent a location of a first source bit matrix operand 201 and a second bit source matrix operand 203. These locations may be a memory location (e.g., an address in memory such as a disk or RAM) or one or more registers.

In this illustration, the first source bit matrix operand 201 is a 64×8 bit matrix. In some embodiments of BMM instructions, a 64×8 bit matrix (8 rows of 64 bits) is stored as a sequence of 8 64-bit rows. As such, access to bit located in row I, column J of matrix M would be: M[I,J]=M[I*64+J] (this is bit reference, not byte), or differently, to get value of bit M[I,J], stored in memory some would use (M[I*8]>>J) &1, assuming byte addressing. A loading of this type of matrix into a 512-bit register comprises reading from a starting address of the first row.

In this illustration, the second source bit matrix operand 203 is an 8×8 bit matrix. In some embodiments of BMM instructions, an 8×8 bit matrix is stored in memory or a one or more registers as a sequence of 8 8-bit rows, starting with row 0. As such, access to bit located in row I, column J of matrix M would be: M[I,J]=M[I*8+J], and if stored in memory: (M[I]>>J) &1.

The destination bit matrix operand field represents a destination bit matrix operand 221 which stores the result of the bit matrix multiplication operation. As detailed earlier, this operand 221 may be stored in a register (e.g., 512-bit register), a collection of registers, or locations in memory.

As shown, execution circuity 211 includes a plurality of multiplication arrays 213 and a plurality of adder arrays 215. The immediate of the instruction is used to select a type of multiplication array 213 and a type of adder array 215. For example, in some embodiments, bits 4:7 of an 8-bit immediate are used by multiplication selector 217 to select the multiplication circuitry from the plurality of multiplication arrays 213. For example, imm8[4:7] selects from XOR, AND, OR, NOR, NAND, and XNOR circuits for multiplication. In some embodiments, bits 0:3 of an 8-bit immediate are used by adder selector 219 to select the multiplication circuitry from the plurality of adder arrays 215. For example, imm8[0:3] selects from XOR, AND, OR, NOR, and XNOR circuits for addition. Any particular arrangement may be used to signal the selection, however, an exemplary table of selections is below:

TABLE 2

| IMMEDIATE[0:3] | ADDER CIRCUIT(S) SELECTED | IMMEDIATE[4:7] | MULTIPLIER CIRCUIT(S) SELECTED |
|---|---|---|---|
| 0000 | XOR | 0000 | XOR |
| 0001 | AND | 0001 | AND |
| 0010 | OR | 0010 | OR |
| 0011 | NOR | 0011 | NOR |
| 0100 | XNOR | 0100 | XNOR |
| 0101 | | 0101 | NAND |

The illustration shows two positions of the calculated result (DESTINATION[0] and DESTINATION[511]). DESTINATION[0] is calculated as follows: DEST[0*8+0]= SRC1[0*8+0]$\otimes$SRC2[0*8+0]$\oplus$SRC1[0*8+1]SRC2[1*8+0]$\oplus$ . . . $\oplus$SRC1[0*8+7]SRC2[7*8+0]. DESTINATION [511] is calculated as: DEST[63*8+7]=SRC1[63*8+0] $\otimes$SRC2[0*8+7]$\oplus$SRC1[63*8+1]$\otimes$SRC2[1*8+7]$\oplus$ . . . $\oplus$SRC1[63*8+7]$\otimes$SRC2[7*8+7].

Figure 3:
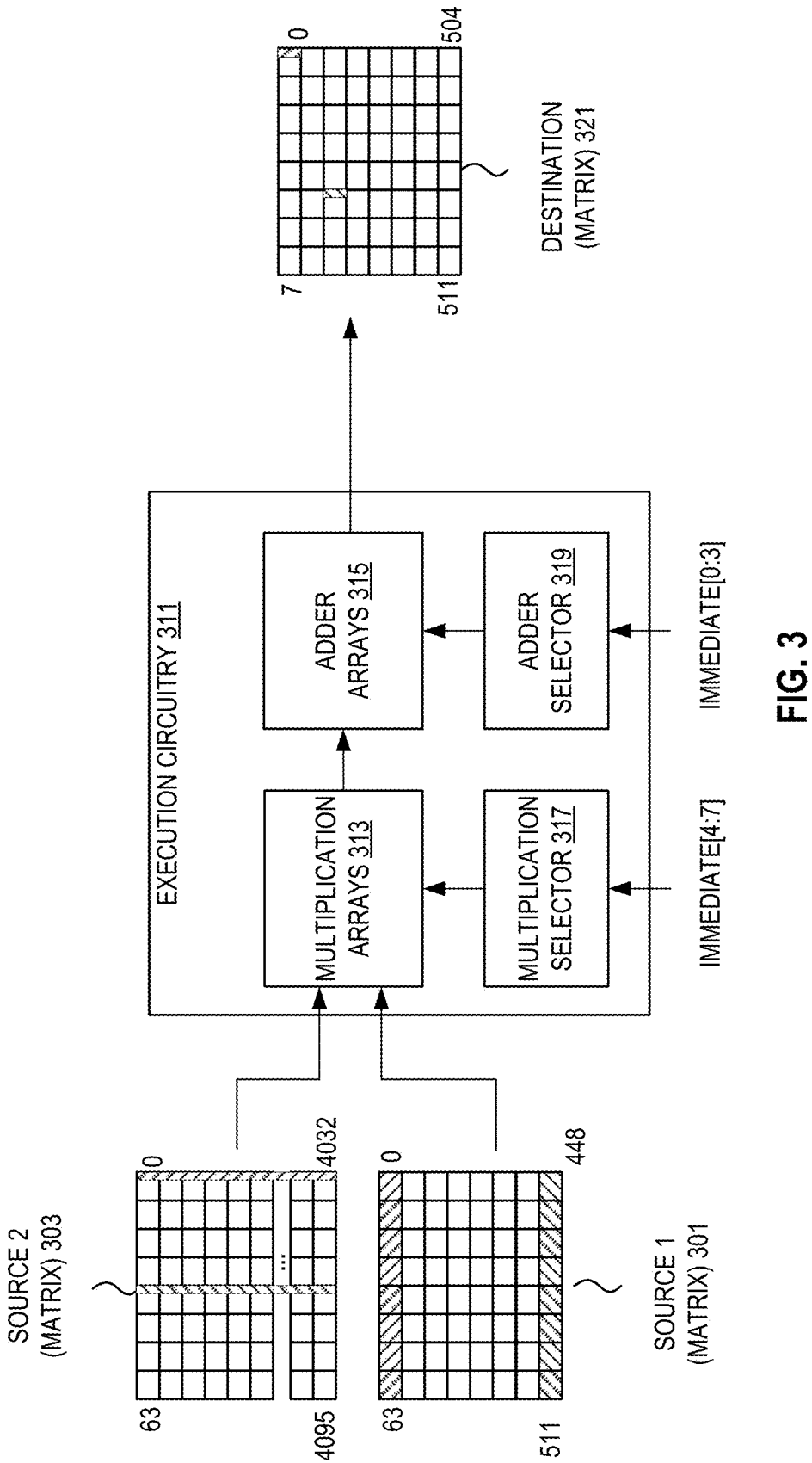
FIG. 3 illustrates an embodiment of a selected portion of execution of a BMM instruction having sources of an 8×64 bit matrix with an 64×64 bit matrix.

FIG. 3 illustrates an embodiment of a selected portion of execution of a BMM instruction having sources of an 8×64 bit matrix with an 64×64 bit matrix. The format of this BMM instruction includes fields for an opcode ("VBMM8×64×64" is the opcode mnemonic in this illustration), a first source bit matrix operand identifier (shown as "SOURCE 1"), a second source bit matrix operand identifier (shown as "SOURCE 2/MEM"), an immediate, and a destination bit matrix operand identifier (shown as "DESTINATION").

The two source operand fields represent a location of a first source bit matrix operand 301 and a second bit source matrix operand 303. These locations may be a memory location (e.g., an address in memory such as a disk or RAM) or one or more registers.

In this illustration, the first source bit matrix operand 301 an 8×64 bit matrix. In some embodiments, an 8×64 bit matrix (8 rows of 64 bits) is stored in memory or one or more registers as a sequence of 64-bit rows starting with row 0. As such, access to bit located in row I, column J of matrix M would be: M[I,J]=M[I*64+J] (this is bit reference, not byte), or differently, to get value of bit M[I,J], stored in memory some would use (M[I*8]>>J)&1, assuming byte addressing.

In this illustration, the second source bit matrix operand 303 is a 64×64 bit matrix. In some embodiments of BMM instructions, a 64×64 bit matrix is stored in memory as a sequence of 64 64-bit rows starting with row 0. So, access to a bit located in row I, column J of matrix M would be: M[I,J]=M[I*64+J] (this is bit reference, not byte), or differently, to get value of bit M[I,J], stored in memory some would use (M[I*8]>>J)&1, assuming byte addressing.

The destination bit matrix operand field represents a destination bit matrix operand 321 which stores the result of the bit matrix multiplication operation. As detailed earlier, this operand 321 may be stored in a register (e.g., 512-bit register), a collection of registers, or locations in memory.

As shown, execution circuity 311 includes a plurality of multiplication arrays 313 and a plurality of adder arrays 315. The immediate of the instruction is used to select a type of multiplication array 313 and a type of adder array 315. For example, in some embodiments, bits 4:7 of an 8-bit immediate are used by multiplication selector 317 to select the multiplication circuitry from the plurality of multiplication arrays 313. For example, imm8[4:7] selects from XOR, AND, OR, NOR, NAND, and XNOR circuits for multiplication. In some embodiments, bits 0:3 of an 8-bit immediate are used by adder selector 319 to select the multiplication circuitry from the plurality of adder arrays 315. For example, imm8[0:3] selects from XOR, AND, OR, NOR, and XNOR circuits for addition. Any particular arrangement may be used to signal the selection, however, an exemplary table of selections is below:

TABLE 3

| IMMEDIATE[0:3] | ADDER CIRCUIT(S) SELECTED | IMMEDIATE[4:7] | MULTIPLIER CIRCUIT(S) SELECTED |
|---|---|---|---|
| 0000 | XOR | 0000 | XOR |
| 0001 | AND | 0001 | AND |
| 0010 | OR | 0010 | OR |
| 0011 | NOR | 0011 | NOR |
| 0100 | XNOR | 0100 | XNOR |
| 0101 | | 0101 | NAND |

The illustration shows two positions of the calculated result (DESTINATION[0] and DESTINATION[168]). DESTINATION[0] is calculated as follows: DEST[0*64+0]=SRC[0*64+0]$\otimes$MEM[0*64+0]$\oplus$SRC[0*64+1]$\otimes$MEM[1*64+0]$\oplus$ . . . $\oplus$SRC[0*64+63]$\otimes$MEM[63*64+0]. DESTINATION[168] is calculated as follows: DEST[2*64+40]= SRC[2*64+0]$\otimes$MEM[0*64+40]$\oplus$SRC[2*64+1]$\otimes$MEM [1*64+40]$\oplus$. . . $\oplus$SRC[2*64+63]$\otimes$MEM[63*64+40].

Figure 4:
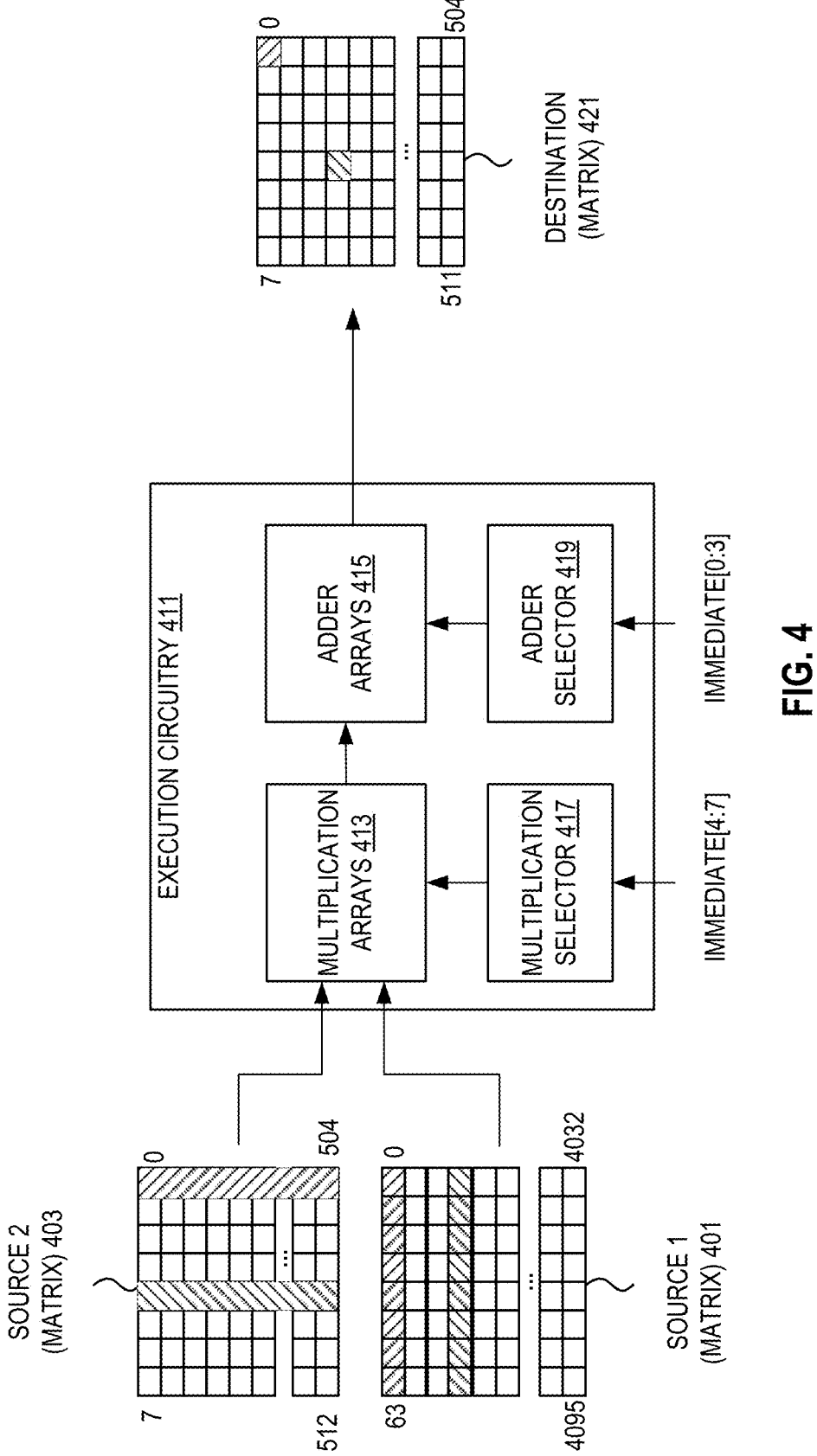
FIG. 4 illustrates an embodiment of a selected portion of execution of a BMM instruction having sources of an 64×64 bit matrix with an 64×8 bit matrix.

FIG. 4 illustrates an embodiment of a selected portion of execution of a BMM instruction having sources of an 64×64 bit matrix with an 64×8 bit matrix. The format of this BMM instruction includes fields for an opcode ("VBMM8×64×64" is the opcode mnemonic in this illustration), a first source bit matrix operand identifier (shown as "SOURCE 1"), a second source bit matrix operand identifier (shown as "SOURCE 2/MEM"), an immediate, and a destination bit matrix operand identifier (shown as "DESTINATION").

The two source operand fields represent a location of a first source bit matrix operand 401 and a second bit source matrix operand 403. These locations may be a memory location (e.g., an address in memory such as a disk or RAM) or one or more registers.

In this illustration, the first source bit matrix operand 401 is a 64×64 bit matrix. In some embodiments of BMM instructions, a 64×64 bit matrix is stored in memory as a sequence of 64 64-bit rows starting with row 0. So, access to a bit located in row I, column J of matrix M would be: M[I,J]=M[I*64+J] (this is bit reference, not byte), or differently, to get value of bit M[I,J], stored in memory some would use (M[I*8]>>J)&1, assuming byte addressing.

In this illustration, the second source bit matrix operand 403 is a 64×8 bit matrix. In some embodiments of BMM instructions, a 64×8 bit matrix (8 rows of 64 bits) is stored as a sequence of 8 64-bit rows. As such, access to bit located in row I, column J of matrix M would be: M[I,J]=M[I*64+J] (this is bit reference, not byte), or differently, to get value of bit M[I,J], stored in memory some would use (M[I*8]>>J) &1, assuming byte addressing. A loading of this type of matrix into a 512-bit register comprises reading from a starting address of the first row.

The destination bit matrix operand field represents a destination bit matrix operand 421 which stores the result of the bit matrix multiplication operation. As detailed earlier, this operand 421 may be stored in a register (e.g., 512-bit register), a collection of registers, or locations in memory.

7 8

As shown, execution circuitry 411 includes a plurality of multiplication arrays 413 and a plurality of adder arrays 415. The immediate of the instruction is used to select a type of multiplication array 413 and a type of adder array 415. For example, in some embodiments, bits 4:7 of an 8-bit immediate are used by multiplication selector 417 to select the multiplication circuitry from the plurality of multiplication arrays 413. For example, imm8[4:7] selects from XOR, AND, OR, NOR, NAND, and XNOR circuits for multiplication. In some embodiments, bits 0:3 of an 8-bit immediate are used by adder selector 419 to select the multiplication circuitry from the plurality of adder arrays 415. For example, imm8[0:3] selects from XOR, AND, OR, NOR, and XNOR circuits for addition. Any particular arrangement may be used to signal the selection, however, an exemplary table of selections is below:

TABLE 4

| IMMEDIATE[0:3] | ADDER CIRCUIT(S) SELECTED | IMMEDIATE[4:7] | MULTIPLIER CIRCUIT(S) SELECTED |
|---|---|---|---|
| 0000 | XOR | 0000 | XOR |
| 0001 | AND | 0001 | AND |
| 0010 | OR | 0010 | OR |
| 0011 | NOR | 0011 | NOR |
| 0100 | XNOR | 0100 | XNOR |
| | | 0101 | NAND |

The illustration shows two positions of the calculated result (DESTINATION[0] and DESTINATION[25]). DESTINATION[0] is calculated as follows: DEST[0*7+0]= MEM[0*64+0]⊗SRC[0*8+0]⊕MEM[0*64+1]⊗SRC [1*8+0]⊕ . . . ⊕MEM[0*64+63]⊗SRC[63*8+0]. DESTINATION[25] is calculated as follows: DEST[3*7+4]=MEM [3*64+0]⊗SRC[0*8+4]⊕MEM[3*64+1]⊗SRC[1*8+4]⊕ ⊕MEM[3*64+63]⊗SRC[63*8+4].

Additionally, in some embodiments, the multiplication and/or addition operations may be logical (AND/OR/XOR/ XNOR/NAND), or arithmetic (add, subtract, multiply) with and without saturation. This may lead to variety of definitions, of which some may be selected and implemented with the immediate operands as selectors. As such, some operations may not be just AND/NAND/etc., but are table based. For example, 2 bits can be interpreted as 0,1,2,3 or as –0,1,–2,–1, or as 0,1,invalid, –1. –1+–1 can be –1, if saturation is on, and –2 if not. 1+1 can be 1 if it's unsigned 2 bits (–1,0,1, no 2). These tables can be pre-defined and immediate operand selects one of such tables. AND/NAND are just specific cases, and can also be implemented as tables. Tables 5 and 6 below provide examples of tables for immediates.

TABLE 5

| | value | signed — unsaturated | signed — saturated symmetrical | signed — saturated unsymmetrical | unsigned — unsaturated | unsigned — saturated |
|---|---|---|---|---|---|---|
| 2-bit | 00 | 0 | 0 | 0 | 0 | 0 |
| | 01 | 1 | 1 | 1 | 1 | 1 |
| | 10 | –2 | N/A (–1) | –2 | 2 | 2 |
| | 11 | –1 | –1 | –1 | 3 | 3 |
| 4-bit | 0000 | 0 | 0 | 0 | 0 | 0 |
| | 0001 | 1 | 1 | 1 | 1 | 1 |
| | 0010 | 2 | 2 | 2 | 2 | 2 |
| | 0011 | 3 | 3 | 3 | 3 | 3 |
| | 0100 | 4 | 4 | 4 | 4 | 4 |
| | 0101 | 5 | 5 | 5 | 5 | 5 |
| | 0110 | 6 | 6 | 6 | 6 | 6 |
| | 0111 | 7 | 7 | 7 | 7 | 7 |
| | 1000 | –8 | N/A (–7) | –8 | 8 | 8 |
| | 1001 | –7 | –7 | –7 | 9 | 9 |
| | 1010 | –6 | –6 | –6 | 10 | 10 |
| | 1011 | –5 | –5 | –5 | 11 | 11 |
| | 1100 | –4 | –4 | –4 | 12 | 12 |
| | 1101 | –3 | –3 | –3 | 13 | 13 |
| | 1110 | –2 | –2 | –2 | 14 | 14 |
| | 1111 | –1 | –1 | –1 | 15 | 15 |

TABLE 6

```
                        signed                                        unsigned
          _____    _____
          unsaturated    saturated                        unsaturated    saturated
                         symmetrical    unsymmetrical
          0 0 1 1        0 0 1 1        0 0 1 1            0 0 1 1        0 0 1 1
          0 1 0 1        0 1 0 1        0 1 0 1            0 1 0 1        0 1 0 1

ADD  0 0 0 1 1          0 0 1 1        0 0 1 1            0 0 1 1        0 0 1 1
     0 0 1 0 1          0 1 0 1        0 1 0 1            0 1 0 1        0 1 0 1
     0 0 1 1 0          0 0 0 0        0 0 1 0            0 1 1 0        0 1 1 1
     1 1 0 1 0          1 1 0 0        1 1 1 0            1 0 1 0        1 0 1 1
     1 1 1 0 0          1 0 1 1        1 1 1 1            1 1 0 0        1 1 1 1
     0 0 1 0 1          1 0 1 1        0 1 0 0            0 0 1 0        1 0 1 1
     1 1 0 0 1          1 0 1 1        1 0 1 1            1 0 0 1        1 1 1 1
     1 1 0 1 0          1 0 1 1        1 0 0 0            0 1 0 1        0 1 1 1
MUL  0 0 0 0 0          0 0 0 0        0 0 0 0            0 0 0 0        0 0 0 0
     0 0 0 0 0          0 0 0 0        0 0 0 0            0 0 0 0        0 0 0 0
     0 0 0 1 1          0 0 1 1        0 0 1 1            0 0 1 1        0 0 1 1
     1 0 1 0 1          0 1 1 1        0 1 0 1            0 1 0 1        0 1 1 1
     1 0 1 0 1          0 1 0 0        0 1 0 0            0 1 0 1        0 1 1 1
     0 0 0 0 0          0 1 1 1        0 0 1 1            0 0 0 0        0 0 1 1
     1 0 1 1 0          0 1 0 0        0 1 0 0            0 1 1 0        0 1 1 1
     1 0 1 0 1          0 1 1 1        0 1 1 1            0 1 0 1        0 1 1 1
```

Figure 5:
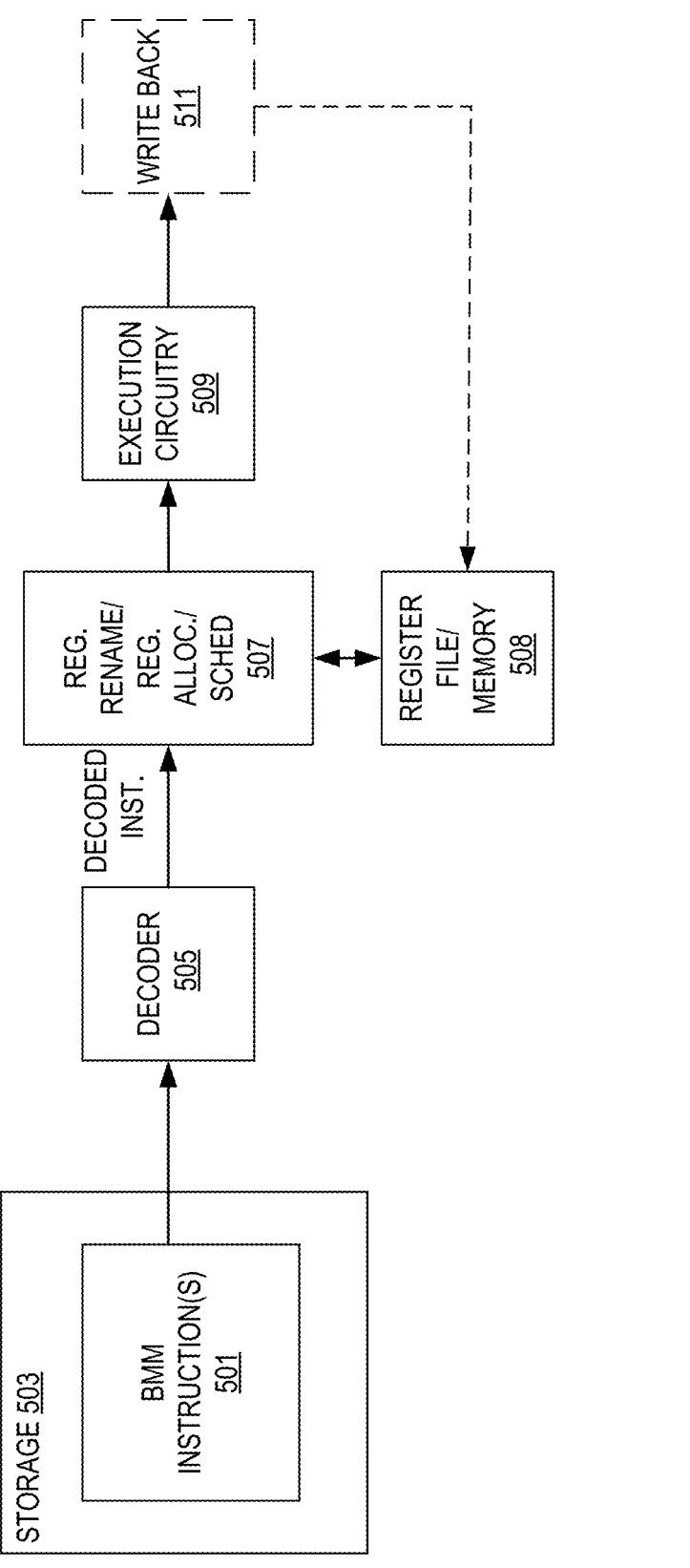
FIG. 5 illustrates an embodiment of hardware to process an instruction such as a BMM instruction.

FIG. 5 illustrates an embodiment of hardware to process an instruction such as a BMM instruction. As illustrated, storage 503 stores a BMM instruction 501 to be executed.

The instruction 501 is received by decode circuitry 505. For example, the decode circuitry 505 receives this instruction from fetch logic/circuitry. The instruction includes fields for an opcode, first and second bit matrix sources, a destination, and an immediate. In some embodiments, the sources and destination are registers, and in other embodiments one or more are memory locations.

More detailed embodiments of at least one instruction format will be detailed later. The decode circuitry 505 decodes the instruction into one or more operations. In some embodiments, this decoding includes generating a plurality of micro-operations to be performed by execution circuitry (such as execution circuitry 509). The decode circuitry 505 also decodes instruction prefixes.

In some embodiments, register renaming, register allocation, and/or scheduling circuitry 507 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 508 store data as operands of the instruction to be operated on by execution circuitry 509. Exemplary register types include packed data registers, general purpose registers, and floating point registers.

Execution circuitry 509 executes the decoded instruction. The execution of the decoded instruction causes the execution circuitry to perform a bit matrix multiplication of the source bit matrices, wherein the particular circuitry used in the multiply and addition aspects are selected via the instruction.

In some embodiments, retirement/write back circuitry 511 architecturally commits the destination register into the registers or memory 508 and retires the instruction.

An embodiment of a format for a BMM instruction is BMMOPCODE DST, SRC1, SRC2, IMM. BMMOPCODE is the opcode of the instruction. Exemplary opcode mnemonics have been detailed above. DST is a field identifying a destination bit matrix operand. SRC1 and SRC2 are one or more fields for source operand identifiers such as a register, register block, and/or memory location. IMM is a field for an immediate. In some embodiments, the operand fields are encoded using VVVV field 920, MOD R/M 940, and/or SIB 950.

In some embodiments, BMM instructions apply to multiple bit (e.g., 2, 4, and 8-bit) operands. In these embodiments, the opcode defines the bit-size to be used, row and column sizes of the sources, and row and column size of the destination. The latter sizes can be seen in the previous examples. For example, the opcode V[S] BMM[R1][C1=R2][C2] mnemonic illustrates an approach to defining these items. In this example,[S] indicates the bit size; R1, C1 defines the row and column sizes of the first source bit matrix; C1, C2 defines the row and column sizes of the second source bit matrix; and R1, C2 defines the row and column sizes of the destination bit matrix.

Examples of these instructions are their functionality are detailed below. In each of these examples, the immediate (imm8) is used as detailed above:

V2BMM8×8×32 dest, src1, src2/m512, imm8—multiply a 8×8 2-bit matrix (SRC1) with an 8×32 2-bit matrix (SRC2) and store the result in an 8×32 2-bit destination matrix (dest).

V2BMM32×8×8 dest, src1, src2/m512, imm8—multiply a 32×8 2-bit matrix (SRC1) with an 8×8 2-bit matrix (SRC2) and store the result in a 32×8 2-bit destination matrix (dest).

V2BMM8×8×32 dest, src1, src2/m512, imm8—multiply an 8×8 2-bit matrix (SRC1) with an 8×32 2-bit matrix (SRC2) and store the result in an 8×32 2-bit destination matrix (dest).

V2BMM32×8×8 dest, src1, src2/m512, imm8—multiply a 32×8 2-bit matrix (SRC1) with an 8×8 2-bit matrix (SRC2) and store the result in a 32×8 2-bit destination matrix (dest).

V2BMM8×32×32 dest, src1, mem, imm8—multiply an 8×32 2-bit matrix (SRC1) with a 32×32 2-bit matrix in memory (mem) and store the result in a 8×32 2-bit destination matrix (dest).

V2BMM32×32×8 dest, mem, src2, imm8—multiply a 32×32 2-bit matrix in memory (mem) with a 32×8 2-bit matrix (SRC2) and store the result in a 32×8 2-bit destination matrix (dest).

V4BMM8×8×16 dest, src1, src2/m512, imm8—multiply an 8×8 4-bit matrix (SRC1) with an 8×16 4-bit matrix (SRC2) and store the result in an 8×16 4-bit destination matrix (dest).

V4BMM16×8×8 dest, src1, src2/m512, imm8—multiply a 16×8 4-bit matrix (SRC1) with an 8×8 4-bit matrix (SRC2) and store the result in a 16×8 4-bit destination matrix (dest).

V4BMM8×16×16 dest, src1, mem, imm8—multiply an 8×16 4-bit matrix (SRC1) with an 16×16 4-bit matrix in memory (mem) and store the result in an 8×16 4-bit destination matrix (dest).

V4BMM16×16×8 dest, mem, src2, imm8—multiply a 16×16 4-bit matrix in memory (mem) with a 16×8 4-bit matrix (SRC2) and store the result in a 16×8 4-bit destination matrix (dest).

In embodiments, encodings of the instruction include a scale-index-base (SIB) type memory addressing operand that indirectly identifies multiple indexed destination locations in memory (e.g., field QAA50). In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x,y,z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit (e.g., XMM) register (vm32x), a 256-bit (e.g., YMM) register (vm32y), or a 512-bit (e.g., ZMM) register (vm32z). In another embodiment, an SIB type memory operand of the form vm64{x,y,z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit (e.g., XMM) register (vm64x), a 256-bit (e.g., YMM) register (vm64y) or a 512-bit (e.g., ZMM) register (vm64z).

Exemplary Execution of the BMM Instructions

FIG. 6 illustrates an embodiment of method performed by a processor to process a BMM instruction.

At 601, an instruction is fetched. For example, a BMM instruction is fetched. The BMM instruction includes fields for an opcode, first and second source bit matrix operand identifiers, a destination bit matrix operand identifier, and an immediate. In some embodiments, the instruction is fetched from an instruction cache. The opcode of the BMM instruction indicates the size of the matrices. In some embodiments, the opcode also indicates the bit sizes of involved in the bit matrix multiplication.

The fetched instruction is decoded at 603. For example, the fetched BMM instruction is decoded by decode circuitry such as that detailed herein.

Data values associated with the identified source operands of the decoded instruction are retrieved at 605 and the decoded instruction is scheduled (as needed). For example, when an identified source operand is a memory operand, the data from the indicated memory location is retrieved.

At 607, the decoded instruction is executed by execution circuitry (hardware) such as that detailed herein. For the BMM instruction, the execution will cause execution circuitry to perform a matrix multiplication of the identified first source bit matrix operand by the identified second source bit matrix operand and store a result of the matrix multiplication in the identified destination bit matrix operand, wherein the immediate of the decoded instruction specifies the multiplication and addition circuits of the execution circuitry to be used in the matrix multiplication.

In some embodiments, the instruction is committed or retired at 609.

Figure 7:
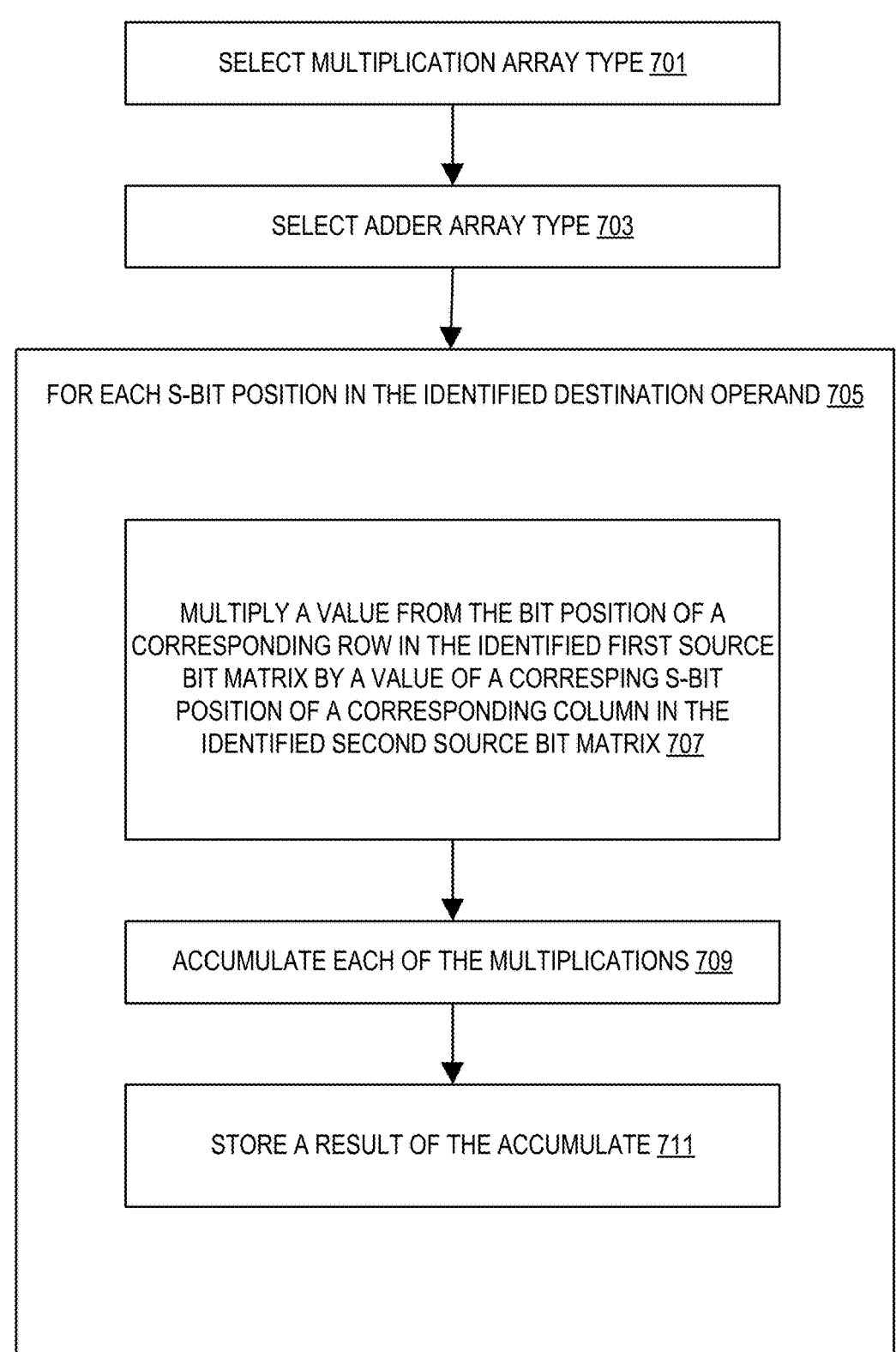
FIG. 7 illustrates a more detailed description of an execution of a BMM instruction.

FIG. 7 illustrates a more detailed description of an execution of a BMM instruction. Typically, this is performed by execution circuitry such as that detailed above. In some embodiments, execution is performed as according to a state machine executed in hardware.

At 701, a multiplication circuitry array type is selected based on the immediate. For example, the multiplication circuitry is selected from circuits such as XOR, AND, OR, NOR, NAND, and XNOR circuits.

At 703, an addition circuitry array type is selected based on the immediate. For example, the multiplication circuitry is selected from circuits such as XOR, AND, OR, NOR, and XNOR circuits.

At 705, for each S-bit position of the identified destination operand a plurality of operations are performed. The "S" value is determined from the opcode and is a value of 1, 2, 4, or 8.

At 707, a value from a bit position of a corresponding row in the identified first source bit matrix is multiplied by a value of a corresponding S-bit position of a corresponding column in the identified second source bit matrix. These multiplications are performed using the selected multiplication circuitry.

At 709, each of the multiplications is accumulated (added together). These additions are performed using the selected multiplication circuitry.

At 711, a result of the accumulation is stored.

Detailed below are exemplary instruction formats, architectures, and systems that may be utilized for the above detailed instructions. For example, an exemplary pipeline supporting the instructions is detailed that includes circuitry to perform the methods detailed herein.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 8A:
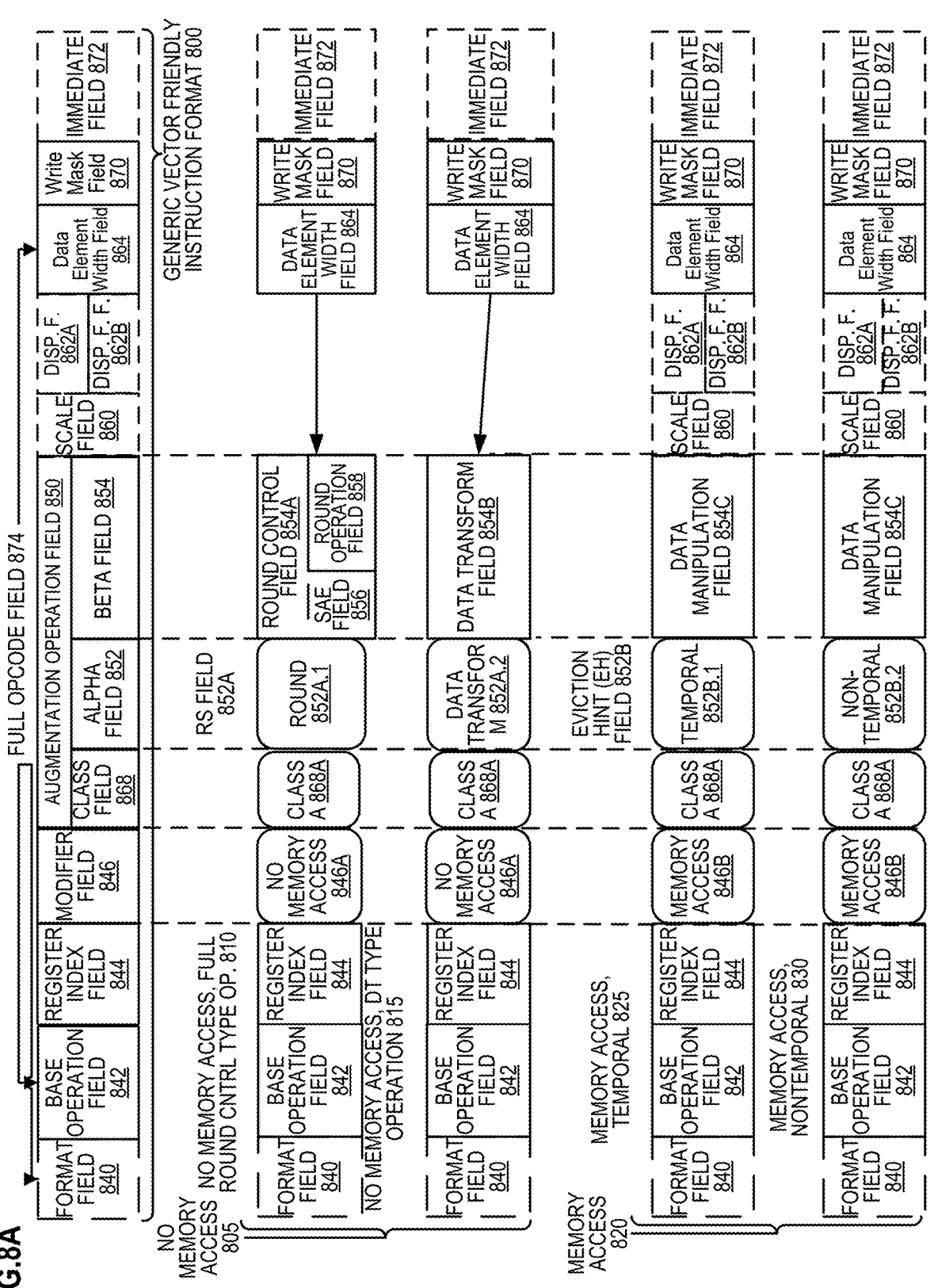
FIGS. 8A-8B are block diagrams illustrating a generic vector friendly instruction format and instruction templates thereof according to embodiments of the invention.
Figure 8B:
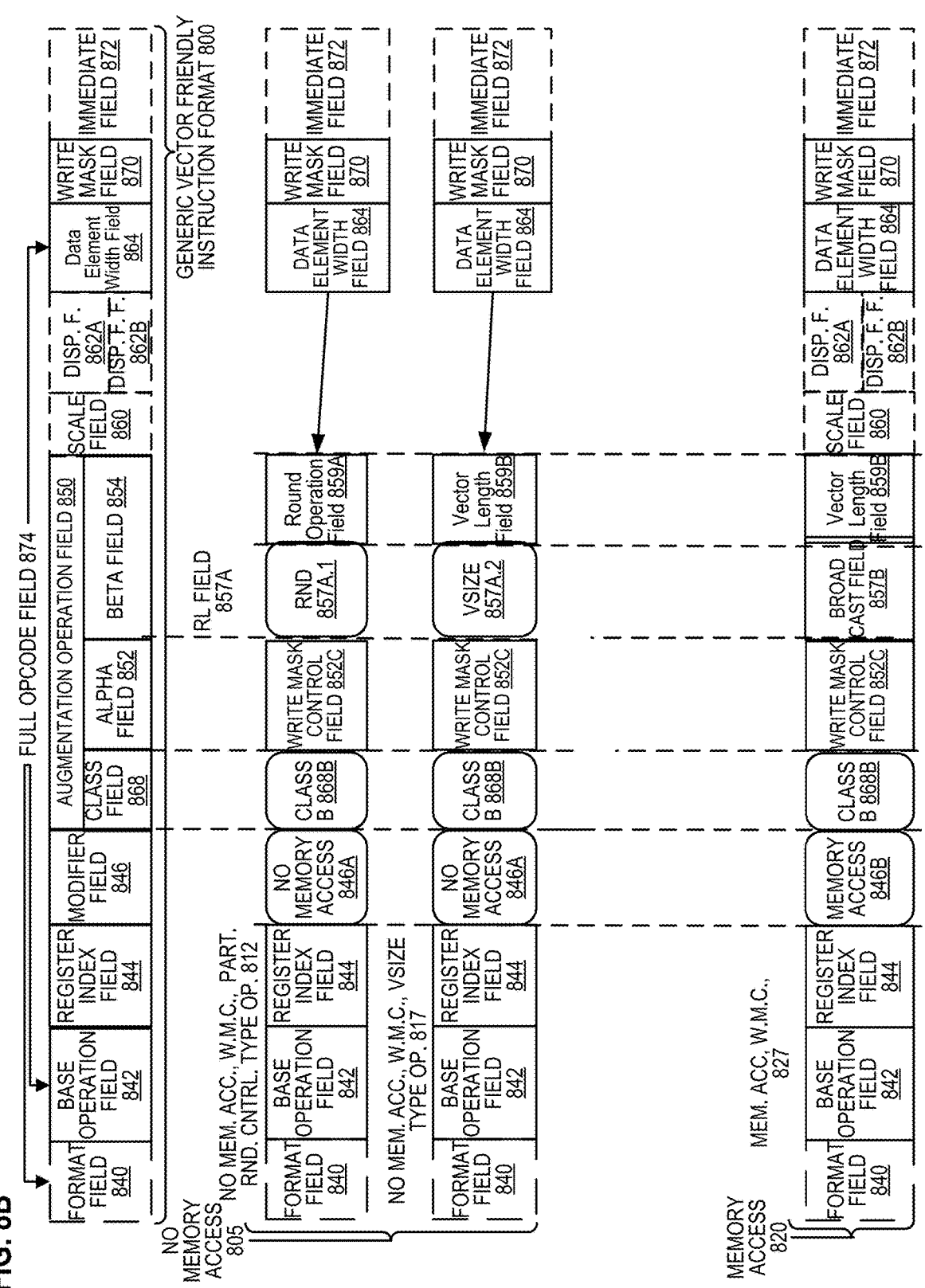

FIGS. 8A-8B are block diagrams illustrating a generic vector friendly instruction format and instruction templates thereof according to embodiments of the invention. FIG. 8A is a block diagram illustrating a generic vector friendly instruction format and class A instruction templates thereof according to embodiments of the invention; while FIG. 8B is a block diagram illustrating the generic vector friendly instruction format and class B instruction templates thereof according to embodiments of the invention. Specifically, a generic vector friendly instruction format 800 for which are defined class A and class B instruction templates, both of which include no memory access 805 instruction templates and memory access 820 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 8A include: 1) within the no memory access 805 instruction templates there is shown a no memory access, full round control type operation 810 instruction template and a no memory access, data transform type operation 815 instruction template; and 2) within the memory access 820 instruction templates there is shown a memory access, temporal 825 instruction template and a memory access, non-temporal 830 instruction template. The class B instruction templates in FIG. 8B include: 1) within the no memory access 805 instruction templates there is shown a no memory access, write mask control, partial round control type operation 812 instruction template and a no memory access, write mask control, vsize type operation 817 instruction template; and 2) within the memory access 820 instruction templates there is shown a memory access, write mask control 827 instruction template.

The generic vector friendly instruction format 800 includes the following fields listed below in the order illustrated in FIGS. 8A-8B.

Format field 840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 842—its content distinguishes different base operations.

Register index field 844—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 846—its content distinguishes occurrences of instructions in the generic vector instruction format that specify memory access from those that do not; that is, between no memory access 805 instruction templates and memory access 820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 850—its content distinguishes which one of a variety of different operations to be performed in addition to the base operation. This field is context specific. In one embodiment of the invention, this field is divided into a class field 868, an alpha field 852, and a beta field 854. The augmentation operation field 850 allows common groups of operations to be performed in a single instruction rather than 2, 3, or 4 instructions.

Scale field 860—its content allows for the scaling of the index field's content for memory address generation (e.g., for address generation that uses $2^{scale}*index+base$).

Displacement Field 862A—its content is used as part of memory address generation (e.g., for address generation that uses $2^{scale}*index+base+displacement$).

Displacement Factor Field 862B (note that the juxtaposition of displacement field 862A directly over displacement factor field 862B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 874 (described later herein) and the data manipulation field 854C. The displacement field 862A and the displacement factor field 862B are optional in the sense that they are not used for the no memory access 805 instruction templates and/or different embodiments may implement only one or none of the two.

Data element width field 864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 870 allows for partial vector operations, including loads, stores, arithmetic, logical, etc. While embodiments of the invention are described in which the write mask field's 870 content selects one of a number of write mask registers that contains the write mask to be used (and thus the write mask field's 870 content indirectly identifies that masking to be performed), alternative embodiments instead or additional allow the mask write field's 870 content to directly specify the masking to be performed.

Immediate field 872—its content allows for the specification of an immediate. This field is optional in the sense that is it not present in an implementation of the generic vector friendly format that does not support immediate and it is not present in instructions that do not use an immediate.

Class field 868—its content distinguishes between different classes of instructions. With reference to FIGS. 8A-B, the contents of this field select between class A and class B instructions. In FIGS. 8A-B, rounded corner squares are used to indicate a specific value is present in a field (e.g., class A 868A and class B 868B for the class field 868 respectively in FIGS. 8A-B).

Instruction Templates of Class A

In the case of the non-memory access 805 instruction templates of class A, the alpha field 852 is interpreted as an RS field 852A, whose content distinguishes which one of the different augmentation operation types are to be performed (e.g., round 852A.1 and data transform 852A.2 are respectively specified for the no memory access, round type operation 810 and the no memory access, data transform type operation 815 instruction templates), while the beta field 854 distinguishes which of the operations of the specified type is to be performed. In the no memory access 805 instruction templates, the scale field 860, the displacement field 862A, and the displacement scale filed 862B are not present.

No-Memory Access Instruction Templates—Full Round Control Type Operation

In the no memory access full round control type operation 810 instruction template, the beta field 854 is interpreted as a round control field 854A, whose content(s) provide static rounding. While in the described embodiments of the invention the round control field 854A includes a suppress all floating point exceptions (SAE) field 856 and a round operation control field 858, alternative embodiments may support may encode both these concepts into the same field or only have one or the other of these concepts/fields (e.g., may have only the round operation control field 858).

SAE field 856—its content distinguishes whether or not to disable the exception event reporting; when the SAE field's 856 content indicates suppression is enabled, a given instruction does not report any kind of floating-point exception flag and does not raise any floating point exception handler.

Round operation control field 858—its content distinguishes which one of a group of rounding operations to perform (e.g., Round-up, Round-down, Round-towards-zero and Round-to-nearest). Thus, the round operation control field 858 allows for the changing of the rounding mode on a per instruction basis. In one embodiment of the invention where a processor includes a control register for specifying rounding modes, the round operation control field's 850 content overrides that register value.

No Memory Access Instruction Templates—Data Transform Type Operation

In the no memory access data transform type operation 815 instruction template, the beta field 854 is interpreted as a data transform field 854B, whose content distinguishes which one of a number of data transforms is to be performed (e.g., no data transform, swizzle, broadcast).

In the case of a memory access 820 instruction template of class A, the alpha field 852 is interpreted as an eviction hint field 852B, whose content distinguishes which one of the eviction hints is to be used (in FIG. 8A, temporal 852B.1 and non-temporal 852B.2 are respectively specified for the memory access, temporal 825 instruction template and the memory access, non-temporal 830 instruction template), while the beta field 854 is interpreted as a data manipulation field 854C, whose content distinguishes which one of a number of data manipulation operations (also known as primitives) is to be performed (e.g., no manipulation; broadcast; up conversion of a source; and down conversion of a destination). The memory access 820 instruction templates include the scale field 860, and optionally the displacement field 862A or the displacement scale field 862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 852 is interpreted as a write mask control (Z) field 852C, whose content distinguishes whether the write masking controlled by the write mask field 870 should be a merging or a zeroing.

In the case of the non-memory access 805 instruction templates of class B, part of the beta field 854 is interpreted as an RL field 857A, whose content distinguishes which one of the different augmentation operation types are to be performed (e.g., round 857A.1 and vector length (VSIZE) 857A.2 are respectively specified for the no memory access, write mask control, partial round control type operation 812 instruction template and the no memory access, write mask control, VSIZE type operation 817 instruction template), while the rest of the beta field 854 distinguishes which of the operations of the specified type is to be performed. In the no memory access 805 instruction templates, the scale field 860, the displacement field 862A, and the displacement scale filed 862B are not present.

In the no memory access, write mask control, partial round control type operation 810 instruction template, the rest of the beta field 854 is interpreted as a round operation field 859A and exception event reporting is disabled (a given instruction does not report any kind of floating-point exception flag and does not raise any floating point exception handler).

Round operation control field 859A—just as round operation control field 858, its content distinguishes which one of a group of rounding operations to perform (e.g., Round-up, Round-down, Round-towards-zero and Round-to-nearest). Thus, the round operation control field 859A allows for the changing of the rounding mode on a per instruction basis. In one embodiment of the invention where a processor includes a control register for specifying rounding modes, the round operation control field's 850 content overrides that register value.

In the no memory access, write mask control, VSIZE type operation 817 instruction template, the rest of the beta field 854 is interpreted as a vector length field 859B, whose content distinguishes which one of a number of data vector lengths is to be performed on (e.g., 128, 256, or 512 byte).

In the case of a memory access 820 instruction template of class B, part of the beta field 854 is interpreted as a broadcast field 857B, whose content distinguishes whether or not the broadcast type data manipulation operation is to be performed, while the rest of the beta field 854 is interpreted the vector length field 859B. The memory access 820 instruction templates include the scale field 860, and optionally the displacement field 862A or the displacement scale field 862B.

With regard to the generic vector friendly instruction format 800, a full opcode field 874 is shown including the format field 840, the base operation field 842, and the data element width field 864. While one embodiment is shown where the full opcode field 874 includes all of these fields, the full opcode field 874 includes less than all of these fields in embodiments that do not support all of them. The full opcode field 874 provides the operation code (opcode).

The augmentation operation field 850, the data element width field 864, and the write mask field 870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 9A is a block diagram illustrating an exemplary specific vector friendly instruction format according to embodiments of the invention. FIG. 9A shows a specific vector friendly instruction format 900 that is specific in the sense that it specifies the location, size, interpretation, and order of the fields, as well as values for some of those fields. The specific vector friendly instruction format 900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 8 into which the fields from FIG. 9A map are illustrated.

It should be understood that, although embodiments of the invention are described with reference to the specific vector friendly instruction format 900 in the context of the generic vector friendly instruction format 800 for illustrative purposes, the invention is not limited to the specific vector friendly instruction format 900 except where claimed. For example, the generic vector friendly instruction format 800 contemplates a variety of possible sizes for the various fields, while the specific vector friendly instruction format 900 is shown as having fields of specific sizes. By way of specific example, while the data element width field 864 is illustrated as a one bit field in the specific vector friendly instruction format 900, the invention is not so limited (that is, the generic vector friendly instruction format 800 contemplates other sizes of the data element width field 864).

The generic vector friendly instruction format 800 includes the following fields listed below in the order illustrated in FIG. 9A.

EVEX Prefix (Bytes 0-3) 902—is encoded in a four-byte form.

Format Field 840 (EVEX Byte 0, bits[7:0])—the first byte (EVEX Byte 0) is the format field 840 and it contains 0x62 (the unique value used for distinguishing the vector friendly instruction format in one embodiment of the invention).

The second-fourth bytes (EVEX Bytes 1-3) include a number of bit fields providing specific capability.

REX field 905 (EVEX Byte 1, bits[7-5])—consists of a EVEX.R bit field (EVEX Byte 1, bit[7]-R), EVEX.X bit field (EVEX byte 1, bit[6]-X), and 857BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 810—this is the first part of the REX' field 810 and is the EVEX.R' bit field (EVEX Byte 1, bit[4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and other RRR from other fields.

Opcode map field 915 (EVEX byte 1, bits[3:0]-mmmm)—its content encodes an implied leading opcode byte (0F, 0F 38, or 0F 3).

Data element width field 864 (EVEX byte 2, bit[7]-W)—is represented by the notation EVEX.W. EVEX.W is used to define the granularity (size) of the datatype (either 32-bit data elements or 64-bit data elements).

EVEX.vvvv 920 (EVEX Byte 2, bits[6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 920 encodes the 4 low-order bits of the first source register specifier stored in inverted (1s complement) form. Depending on the instruction, an extra different EVEX bit field is used to extend the specifier size to 32 registers.

EVEX.U 868 Class field (EVEX byte 2, bit[2]-U)—If EVEX.U=0, it indicates class A or EVEX.U0; if EVEX.U=1, it indicates class B or EVEX.U1.

Prefix encoding field 925 (EVEX byte 2, bits[1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 852 (EVEX byte 3, bit[7]—EH; also known as EVEX.EH, EVEX.rs, EVEX.RL, EVEX.write mask control, and EVEX.N; also illustrated with α)—as previously described, this field is context specific.

Beta field 854 (EVEX byte 3, bits[6:4]-SSS, also known as EVEX.s$_{2-0}$, EVEX.r$_{2-0}$, EVEX.rr1, EVEX.LL0, EVEX.LLB; also illustrated with βββ)—as previously described, this field is context specific.

REX' field 810—this is the remainder of the REX' field and is the EVEX.V' bit field (EVEX Byte 3, bit[3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 870 (EVEX byte 3, bits[2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 930 (Byte 4) is also known as the opcode byte. Part of the opcode is specified in this field.

MOD R/M Field 940 (Byte 5) includes MOD field 942, Reg field 944, and R/M field 946. As previously described, the MOD field's 942 content distinguishes between memory access and non-memory access operations. The role of Reg field 944 can be summarized to two situations: encoding either the destination register operand or a source register operand, or be treated as an opcode extension and not used to encode any instruction operand. The role of R/M field 946 may include the following: encoding the instruction operand that references a memory address, or encoding either the destination register operand or a source register operand.

Scale, Index, Base (SIB) Byte (Byte 6)—As previously described, the scale field's 850 content is used for memory address generation. SIB.xxx 954 and SIB.bbb 956—the contents of these fields have been previously referred to with regard to the register indexes Xxxx and Bbbb.

Displacement field 862A (Bytes 7-10)—when MOD field 942 contains 10, bytes 7-10 are the displacement field 862A, and it works the same as the legacy 32-bit displacement (disp32) and works at byte granularity.

Displacement factor field 862B (Byte 7)—when MOD field 942 contains 01, byte 7 is the displacement factor field 862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 862B is a reinterpretation of disp8; when using displacement factor field 862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 862B substitutes the legacy x86 instruction set 8-bit displacement. Thus, the displacement factor field 862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 872 operates as previously described.

Full Opcode Field

FIG. 9B is a block diagram illustrating the fields of the specific vector friendly instruction format 900 that make up the full opcode field 874 according to one embodiment of the invention. Specifically, the full opcode field 874 includes the format field 840, the base operation field 842, and the data element width (W) field 864. The base operation field 842 includes the prefix encoding field 925, the opcode map field 915, and the real opcode field 930.

Register Index Field

FIG. 9C is a block diagram illustrating the fields of the specific vector friendly instruction format 900 that make up the register index field 844 according to one embodiment of the invention. Specifically, the register index field 844 includes the REX field 905, the REX' field 910, the MODR/M.reg field 944, the MODR/M.r/m field 946, the VVVV field 920, xxx field 954, and the bbb field 956.

Augmentation Operation Field

Figure 9D:
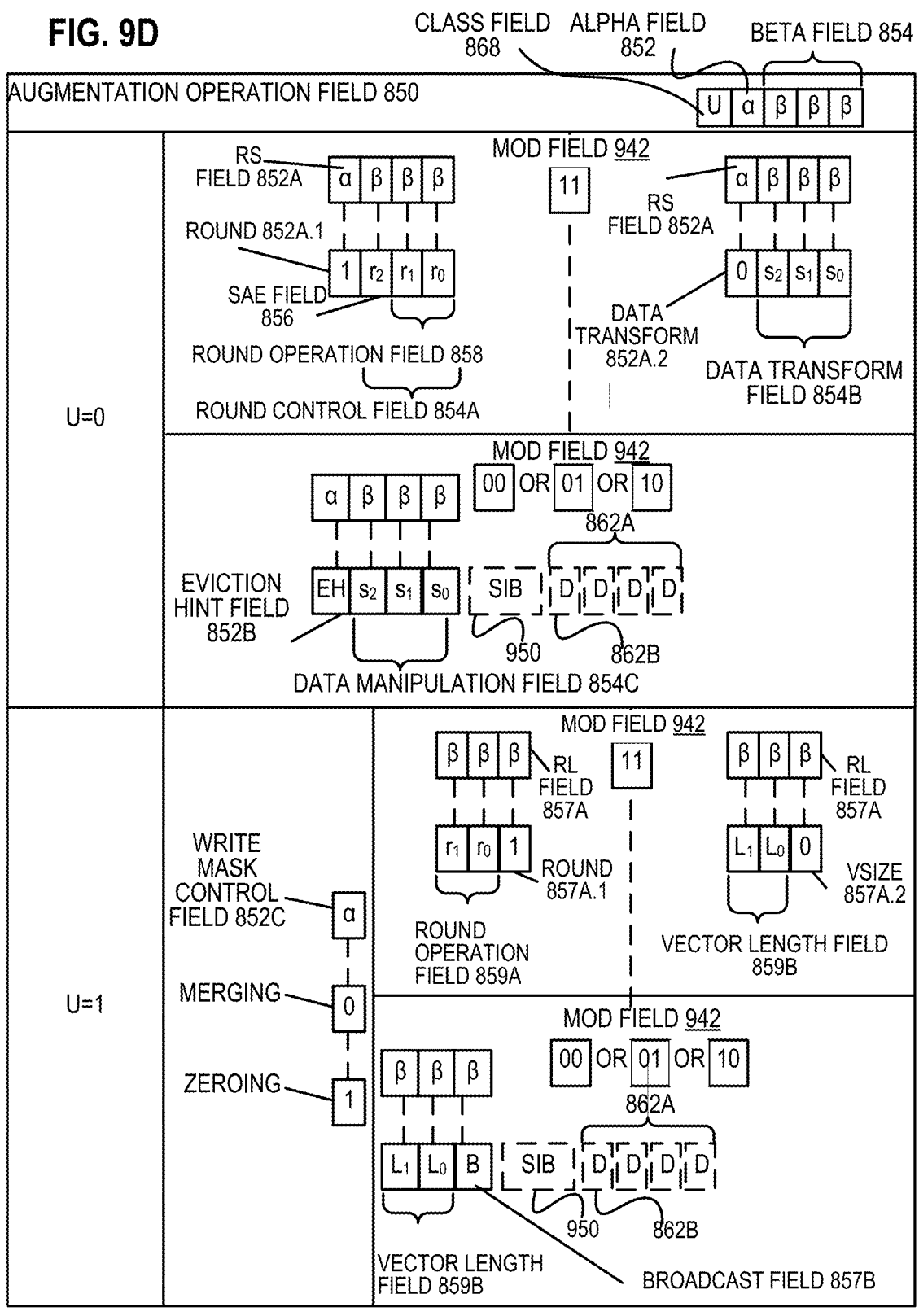
FIG. 9D is a block diagram illustrating the fields of the specific vector friendly instruction format 900 that make up the augmentation operation field 850 according to one embodiment of the invention.

FIG. 9D is a block diagram illustrating the fields of the specific vector friendly instruction format 900 that make up the augmentation operation field 850 according to one embodiment of the invention. When the class (U) field 868 contains 0, it signifies EVEX.U0 (class A 868A); when it contains 1, it signifies EVEX.U1 (class B 868B). When U=0 and the MOD field 942 contains 11 (signifying a no memory access operation), the alpha field 852 (EVEX byte 3, bit[7]-EH) is interpreted as the rs field 852A. When the rs field 852A contains a 1 (round 852A.1), the beta field 854 (EVEX byte 3, bits[6:4]-SSS) is interpreted as the round control field 854A. The round control field 854A includes a one bit SAE field 856 and a two bit round operation field 858. When the rs field 852A contains a 0 (data transform 852A.2), the beta field 854 (EVEX byte 3, bits[6:4]-SSS) is interpreted as a three bit data transform field 854B. When U=0 and the MOD field 942 contains 00, 01, or 10 (signifying a memory access operation), the alpha field 852 (EVEX byte 3, bit[7]-EH) is interpreted as the eviction hint (EH) field 852B and the beta field 854 (EVEX byte 3, bits[6:4]-SSS) is interpreted as a three bit data manipulation field 854C.

When U=1, the alpha field 852 (EVEX byte 3, bit[7]-EH) is interpreted as the write mask control (Z) field 852C. When U=1 and the MOD field 942 contains 11 (signifying a no memory access operation), part of the beta field 854 (EVEX byte 3, bit[4]-$S_0$) is interpreted as the RL field 857A; when it contains a 1 (round 857A.1) the rest of the beta field 854 (EVEX byte 3, bit[6-5]-$S_{2-1}$) is interpreted as the round operation field 859A, while when the RL field 857A contains a 0 (VSIZE 857.A2) the rest of the beta field 854 (EVEX byte 3, bit[6-5]-$S_{2-1}$) is interpreted as the vector length field 859B (EVEX byte 3, bit[6-5]-$L_{1-0}$). When U=1 and the MOD field 942 contains 00, 01, or 10 (signifying a memory access operation), the beta field 854 (EVEX byte 3, bits[6:4]-SSS) is interpreted as the vector length field 859B (EVEX byte 3, bit[6-5]-$L_{1-0}$) and the broadcast field 857B (EVEX byte 3, bit[4]-B).

Exemplary Register Architecture

Figure 10:
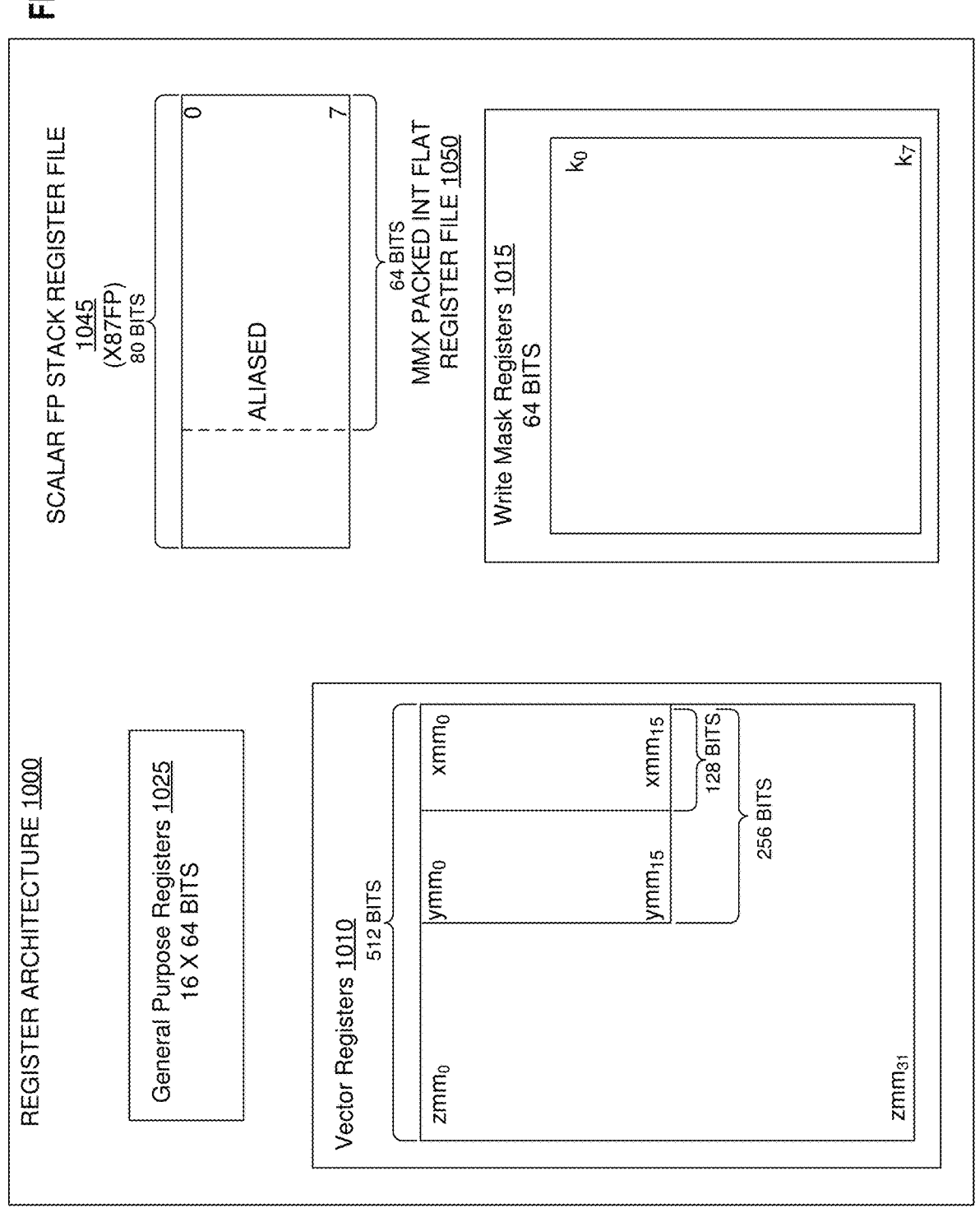
FIG. 10 is a block diagram of a register architecture 1000 according to one embodiment of the invention.

FIG. 10 is a block diagram of a register architecture 1000 according to one embodiment of the invention. In the embodiment illustrated, there are 32 vector registers 1010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 900 operates on these overlaid register file as illustrated in the below tables.

| Adjustable Vector Length | Class | Operations | Registers |
|---|---|---|---|
| Instruction Templates that do not include the vector length field 859B | A (FIG. 8A; U = 0) | 810, 815, 825, 830 | zmm registers (the vector length is 64 byte) |
| | B (FIG. 8B; U = 1) | 812 | zmm registers (the vector length is 64 byte) |
| Instruction templates that do include the vector length field 859B | B (FIG. 8B; U = 1) | 817, 827 | zmm, ymm, or xmm registers (the vector length is 64 byte, 32 byte, or 16 byte) depending on the vector length field 859B |

In other words, the vector length field 859B selects between a maximum length and one or more other shorter lengths, where each such shorter length is half the length of the preceding length; and instructions templates without the vector length field 859B operate on the maximum vector length. Further, in one embodiment, the class B instruction templates of the specific vector friendly instruction format 900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1015—in the embodiment illustrated, there are 8 write mask registers (k0 through k7), each 64 bits in size. In an alternate embodiment, the write mask registers 1015 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1045, on which is aliased the MMX packed integer flat register file 1050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 11A, 11B:
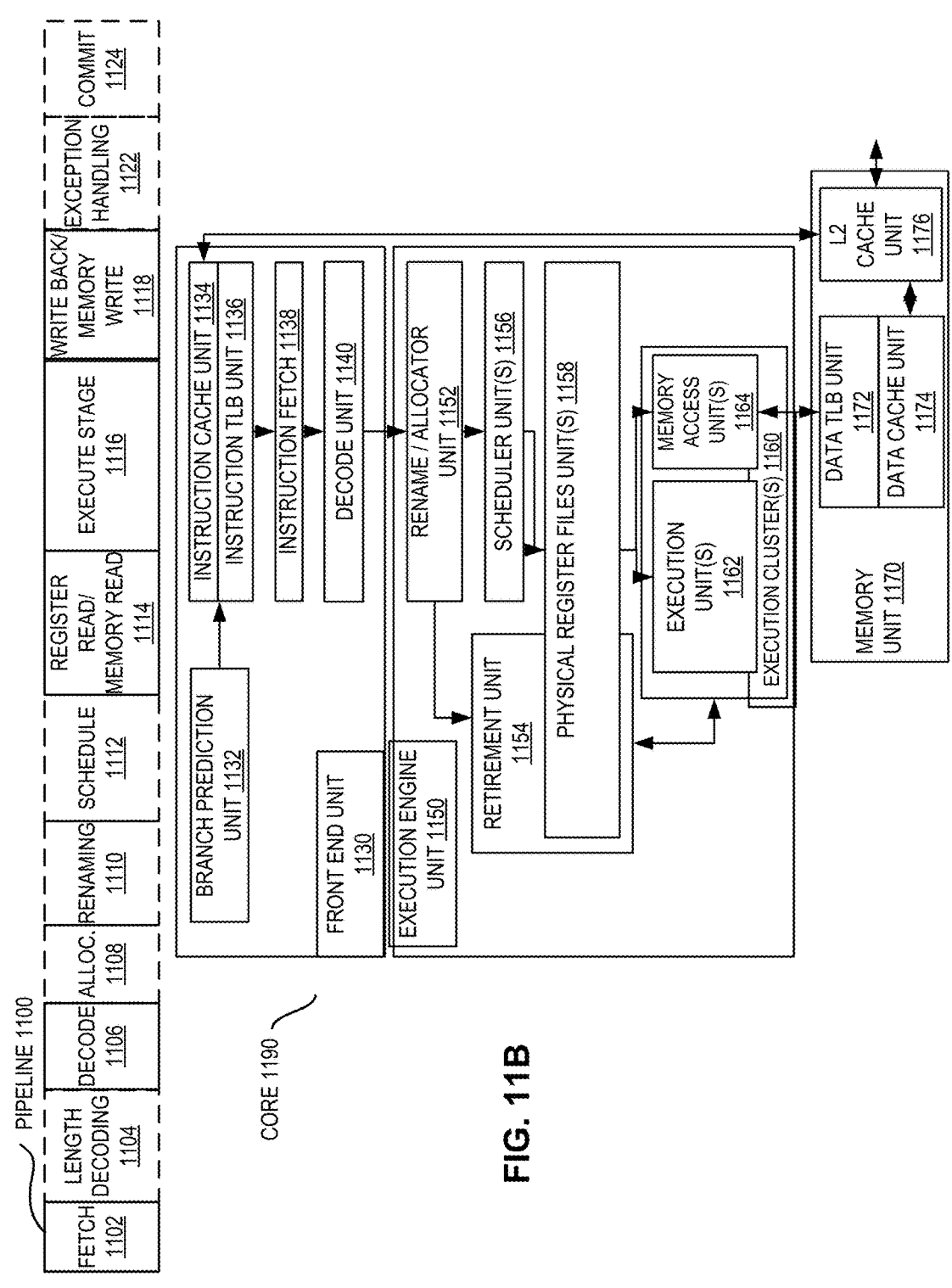
FIG. 11A is a block diagram illustrating both an exemplary in-order pipeline and an exemplary register renaming, out-of-order issue/execution pipeline according to embodiments of the invention.
FIG. 11B is a block diagram illustrating both an exemplary embodiment of an in-order architecture core and an exemplary register renaming, out-of-order issue/execution architecture core to be included in a processor according to embodiments of the invention.

FIG. 11A is a block diagram illustrating both an exemplary in-order pipeline and an exemplary register renaming, out-of-order issue/execution pipeline according to embodiments of the invention. FIG. 11B is a block diagram illustrating both an exemplary embodiment of an in-order architecture core and an exemplary register renaming, out-of-order issue/execution architecture core to be included in a processor according to embodiments of the invention. The solid lined boxes in FIGS. 11A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers. The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster- and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one exemplary embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory.

By way of example, the exemplary register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 12B:
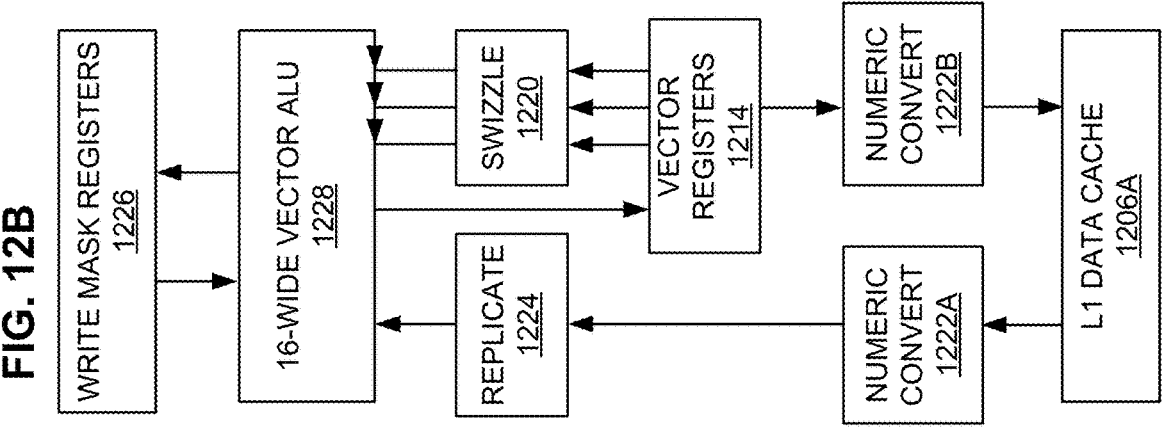
FIGS. 12A-B illustrate a block diagram of a more specific exemplary in-order core architecture, which core would be one of several logic blocks (including other cores of the same type and/or different types) in a chip.
Figure 12A:
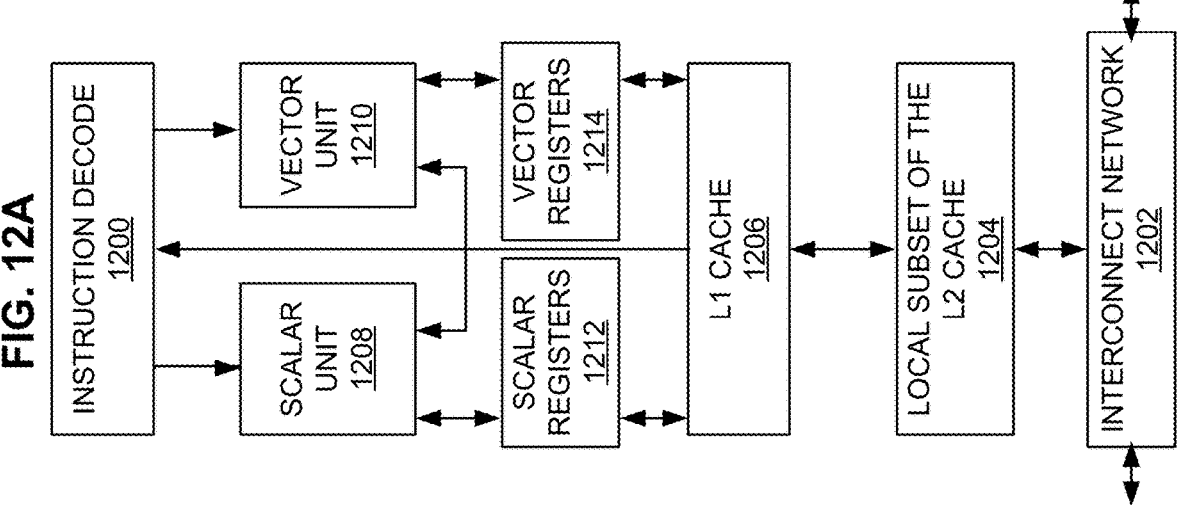

FIGS. 12A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 12A is a block diagram of a single processor core, along with its connection to the on-die interconnect network 1202 and with its local subset of the Level 2 (L2) cache 1204, according to embodiments of the invention. In one embodiment, an instruction decoder 1200 supports the x86 instruction set with a packed data instruction set extension. An L1 cache 1206 allows low-latency accesses to cache memory into the scalar and vector units. While in one embodiment (to simplify the design), a scalar unit 1208 and a vector unit 1210 use separate register sets (respectively, scalar registers 1212 and vector registers 1214) and data transferred between them is written to memory and then read back in from a level 1 (L1) cache 1206, alternative embodiments of the invention may use a different approach (e.g., use a single register set or include a communication path that allow data to be transferred between the two register files without being written and read back).

The local subset of the L2 cache 1204 is part of a global L2 cache that is divided into separate local subsets, one per processor core. Each processor core has a direct access path to its own local subset of the L2 cache 1204. Data read by a processor core is stored in its L2 cache subset 1204 and can be accessed quickly, in parallel with other processor cores accessing their own local L2 cache subsets. Data written by a processor core is stored in its own L2 cache subset 1204 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 12B is an expanded view of part of the processor core in FIG. 12A according to embodiments of the invention. FIG. 12B includes an L1 data cache 1206A part of the L1 cache 1204, as well as more detail regarding the vector unit 1210 and the vector registers 1214. Specifically, the vector unit 1210 is a 16-wide vector processing unit (VPU) (see the 16-wide ALU 1228), which executes one or more of integer, single-precision float, and double-precision float instructions. The VPU supports swizzling the register inputs with swizzle unit 1220, numeric conversion with numeric convert units 1222A-B, and replication with replication unit 1224 on the memory input. Write mask registers 1226 allow predicating resulting vector writes.

Figure 13:
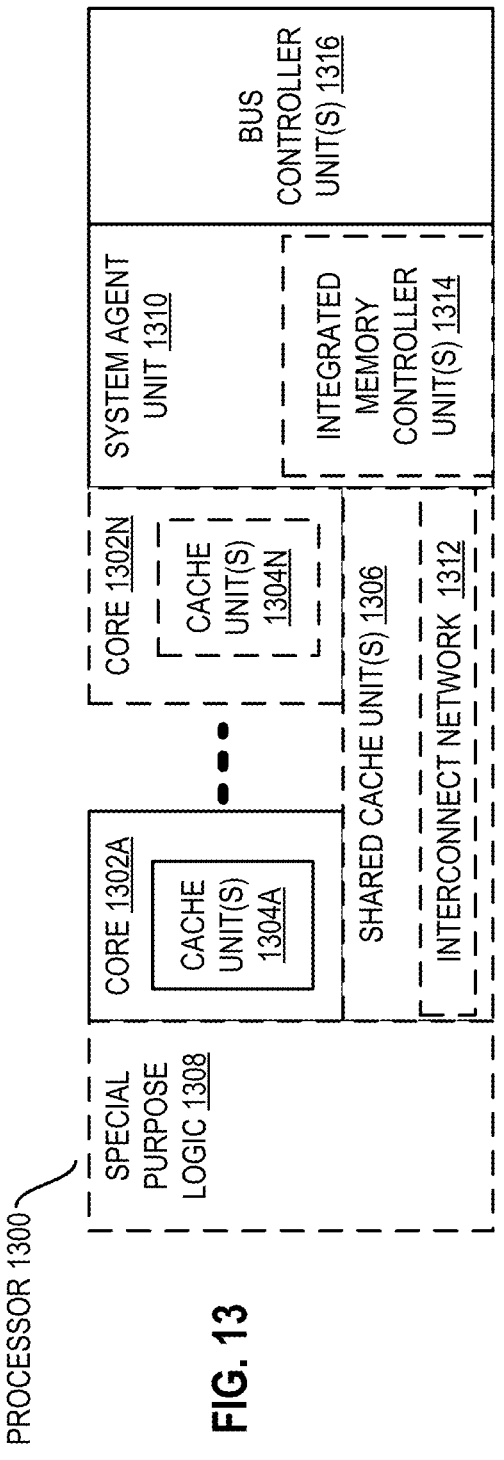
FIG. 13 is a block diagram of a processor 1300 that may have more than one core, may have an integrated memory controller, and may have integrated graphics according to embodiments of the invention.

FIG. 13 is a block diagram of a processor 1300 that may have more than one core, may have an integrated memory controller, and may have integrated graphics according to embodiments of the invention. The solid lined boxes in FIG. 13 illustrate a processor 1300 with a single core 1302A, a system agent 1310, a set of one or more bus controller units 1316, while the optional addition of the dashed lined boxes illustrates an alternative processor 1300 with multiple cores 1302A-N, a set of one or more integrated memory controller unit(s) 1314 in the system agent unit 1310, and special purpose logic 1308.

Thus, different implementations of the processor 1300 may include: 1) a CPU with the special purpose logic 1308 being integrated graphics and/or scientific (throughput) logic (which may include one or more cores), and the cores 1302A-N being one or more general purpose cores (e.g., general purpose in-order cores, general purpose out-of-order cores, a combination of the two); 2) a coprocessor with the cores 1302A-N being a large number of special purpose cores intended primarily for graphics and/or scientific (throughput); and 3) a coprocessor with the cores 1302A-N being a large number of general purpose in-order cores. Thus, the processor 1300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1306, and external memory (not shown) coupled to the set of integrated memory controller units 1314. The set of shared cache units 1306 may include one or more mid-level caches, such as level 2 (L2), level 3 (L3), level 4 (L4), or other levels of cache, a last level cache (LLC), and/or combinations thereof. While in one embodiment a ring based interconnect unit 1312 interconnects the integrated graphics logic 1308 (integrated graphics logic 1308 is an example of and is also referred to herein as special purpose logic), the set of shared cache units 1306, and the system agent unit 1310/integrated memory controller unit(s) 1314, alternative embodiments may use any number of well-known techniques for interconnecting such units. In one embodiment, coherency is maintained between one or more cache units 1306 and cores 1302-A-N.

In some embodiments, one or more of the cores 1302A-N are capable of multi-threading. The system agent 1310 includes those components coordinating and operating cores 1302A-N. The system agent unit 1310 may include for example a power control unit (PCU) and a display unit. The PCU may be or include logic and components needed for regulating the power state of the cores 1302A-N and the integrated graphics logic 1308. The display unit is for driving one or more externally connected displays.

The cores 1302A-N may be homogenous or heterogeneous in terms of architecture instruction set; that is, two or more of the cores 1302A-N may be capable of execution the same instruction set, while others may be capable of executing only a subset of that instruction set or a different instruction set.

Exemplary Computer Architectures

FIGS. 14-17 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 14:
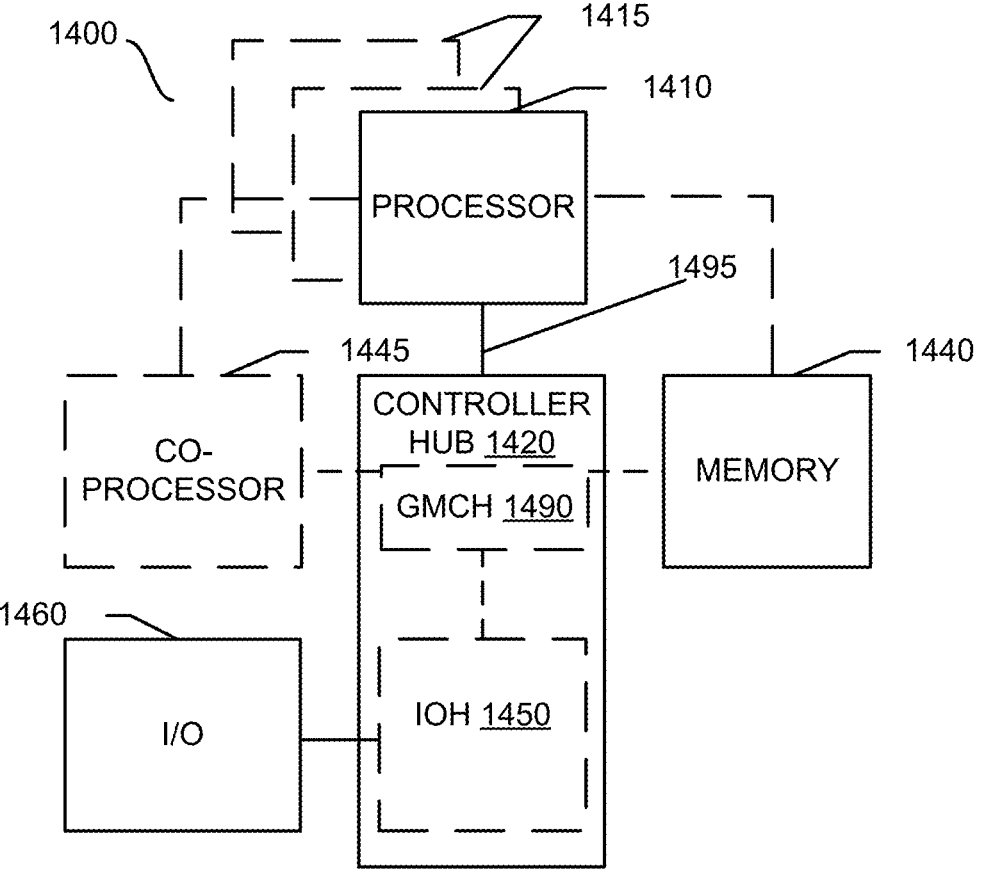
FIG. 14 shown a block diagram of a system in accordance with one embodiment of the present invention.

Referring now to FIG. 14, shown is a block diagram of a system 1400 in accordance with one embodiment of the present invention. The system 1400 may include one or more processors 1410, 1415, which are coupled to a controller hub 1420. In one embodiment the controller hub 1420 includes a graphics memory controller hub (GMCH) 1490 and an Input/Output Hub (IOH) 1450 (which may be on separate chips); the GMCH 1490 includes memory and graphics controllers to which are coupled memory 1440 and a coprocessor 1445; the IOH 1450 couples input/output (I/O) devices 1460 to the GMCH 1490. Alternatively, one or both of the memory and graphics controllers are integrated within the processor (as described herein), the memory 1440 and the coprocessor 1445 are coupled directly to the processor 1410, and the controller hub 1420 in a single chip with the IOH 1450.

The optional nature of additional processors 1415 is denoted in FIG. 14 with broken lines. Each processor 1410, 1415 may include one or more of the processing cores described herein and may be some version of the processor 1300.

The memory 1440 may be, for example, dynamic random access memory (DRAM), phase change memory (PCM), or a combination of the two. For at least one embodiment, the controller hub 1420 communicates with the processor(s) 1410, 1415 via a multi-drop bus, such as a frontside bus (FSB), point-to-point interface such as QuickPath Interconnect (QPI), or similar connection 1495.

In one embodiment, the coprocessor 1445 is a special-purpose processor, such as, for example, a high-throughput MIC processor, a network or communication processor, compression engine, graphics processor, GPGPU, embedded processor, or the like. In one embodiment, controller hub 1420 may include an integrated graphics accelerator.

There can be a variety of differences between the physical resources 1410, 1415 in terms of a spectrum of metrics of merit including architectural, microarchitectural, thermal, power consumption characteristics, and the like.

In one embodiment, the processor 1410 executes instructions that control data processing operations of a general type. Embedded within the instructions may be coprocessor instructions. The processor 1410 recognizes these coprocessor instructions as being of a type that should be executed by the attached coprocessor 1445. Accordingly, the processor 1410 issues these coprocessor instructions (or control signals representing coprocessor instructions) on a coprocessor bus or other interconnect, to coprocessor 1445. Coprocessor (s) 1445 accept and execute the received coprocessor instructions.

Figure 15:
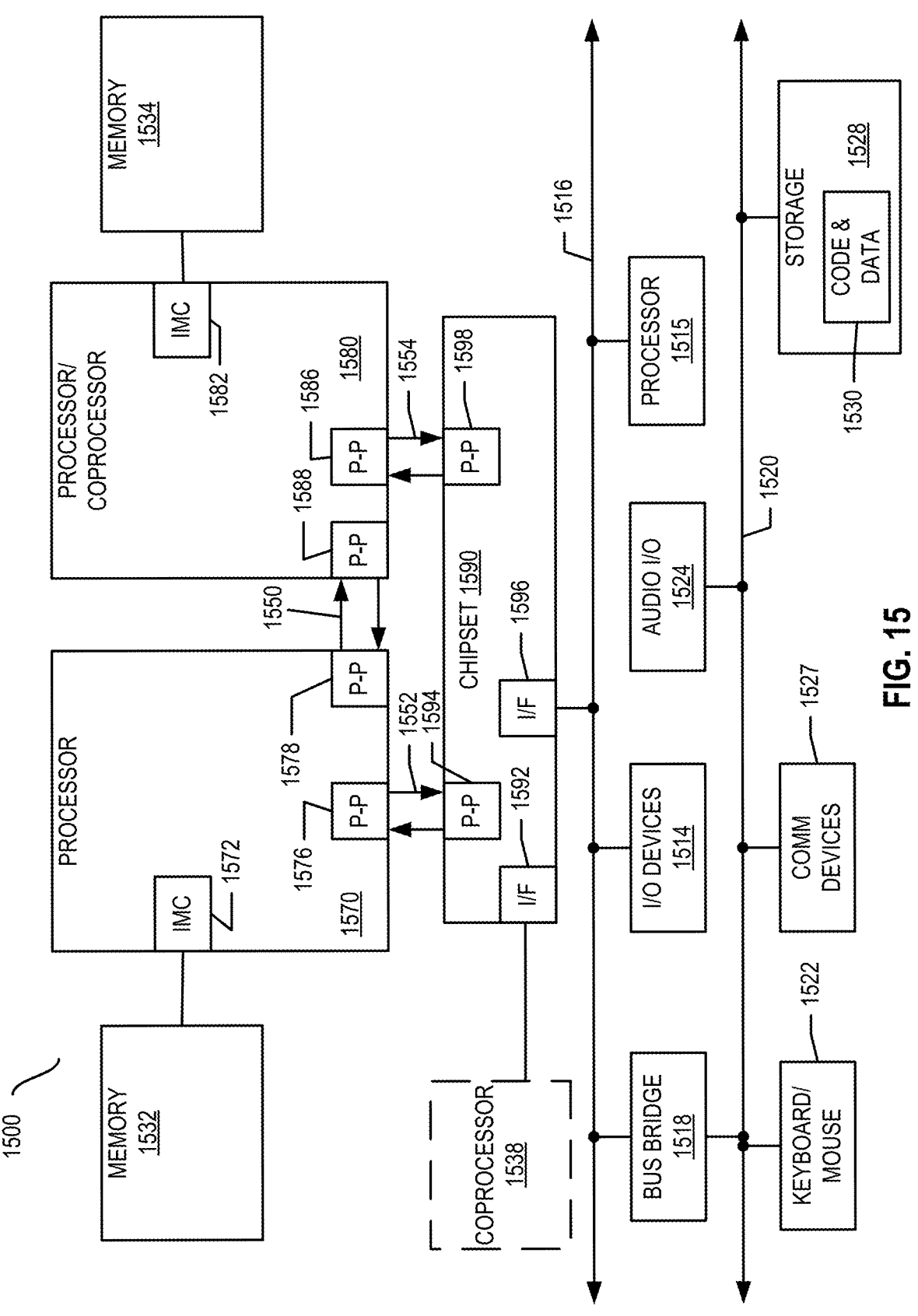
FIG. 15 is a block diagram of a first more specific exemplary system in accordance with an embodiment of the present invention.

Referring now to FIG. 15, shown is a block diagram of a first more specific exemplary system 1500 in accordance with an embodiment of the present invention. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of the processor 1300. In one embodiment of the invention, processors 1570 and 1580 are respectively processors 1410 and 1415, while coprocessor 1538 is coprocessor 1445. In another embodiment, processors 1570 and 1580 are respectively processor 1410 coprocessor 1445.

Processors 1570 and 1580 are shown including integrated memory controller (IMC) units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 may each exchange information with a chipset 1590 via individual P-P interfaces 1552, 1554 using point to point interface circuits 1576, 1594, 1586, 1598. Chipset 1590 may optionally exchange information with the coprocessor 1538 via a high-performance interface 1592. In one embodiment, the coprocessor 1538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present invention is not so limited.

As shown in FIG. 15, various I/O devices 1514 may be coupled to first bus 1516, along with a bus bridge 1518 which couples first bus 1516 to a second bus 1520. In one embodiment, one or more additional processor(s) 1515, such as coprocessors, high-throughput MIC processors, GPGPU's, accelerators (such as, e.g., graphics accelerators or digital signal processing (DSP) units), field programmable gate arrays, or any other processor, are coupled to first bus 1516. In one embodiment, second bus 1520 may be a low pin count (LPC) bus. Various devices may be coupled to a second bus 1520 including, for example, a keyboard and/or mouse 1522, communication devices 1527 and a storage unit 1528 such as a disk drive or other mass storage device which may include instructions/code and data 1530, in one embodiment. Further, an audio I/O 1524 may be coupled to the second bus 1520. Note that other architectures are possible. For example, instead of the point-to-point architecture of FIG. 15, a system may implement a multi-drop bus or other such architecture.

Figure 16:
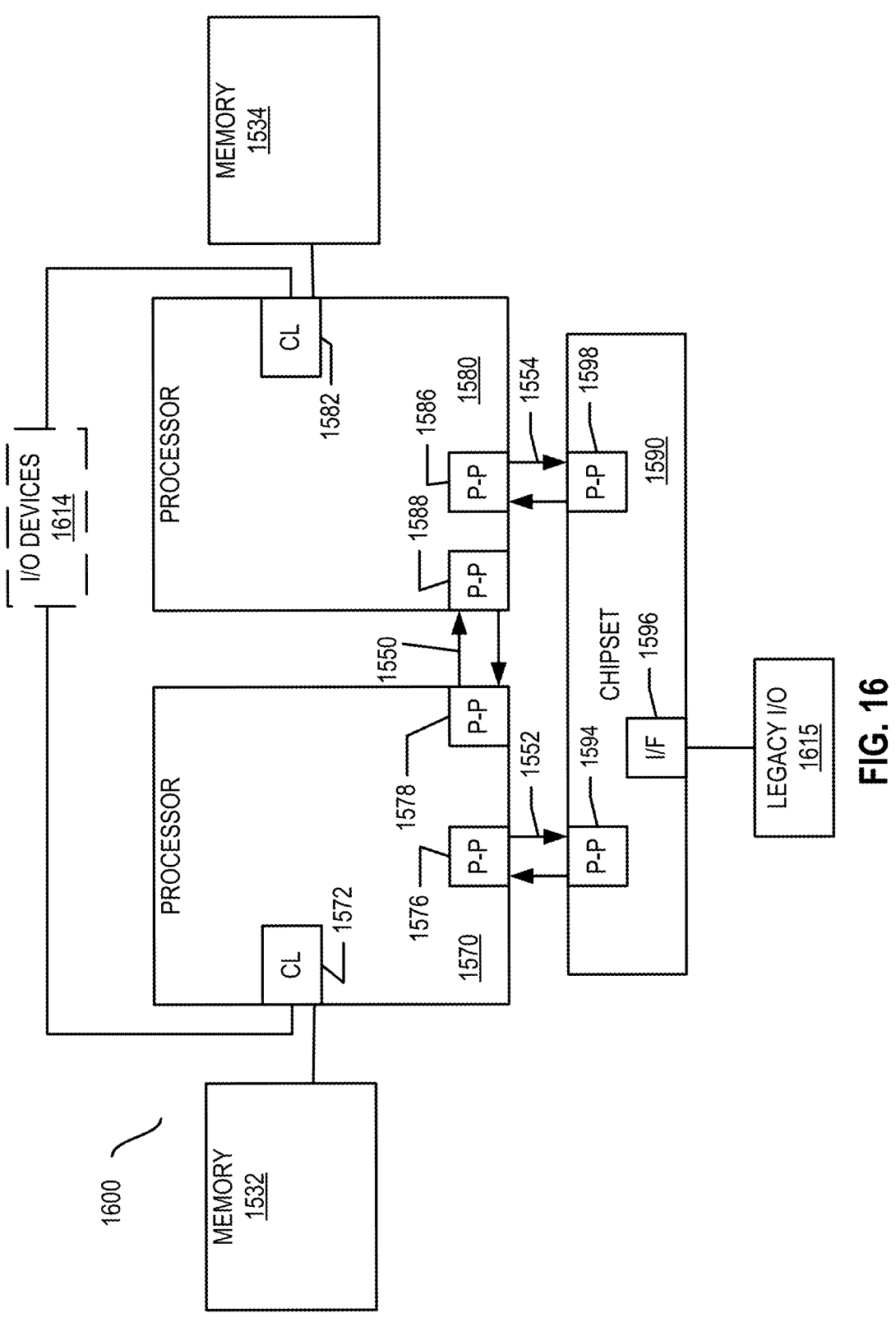
FIG. 16 is a block diagram of a second more specific exemplary system in accordance with an embodiment of the present invention.

Referring now to FIG. 16, shown is a block diagram of a second more specific exemplary system 1600 in accordance with an embodiment of the present invention. Like elements in FIGS. 15 and 16 bear like reference numerals, and certain aspects of FIG. 15 have been omitted from FIG. 16 in order to avoid obscuring other aspects of FIG. 16.

FIG. 16 illustrates that the processors 1570, 1580 may include integrated memory and I/O control logic ("CL") 1572 and 1582, respectively. Thus, the CL 1572, 1582 include integrated memory controller units and include I/O control logic. FIG. 16 illustrates that not only are the memories 1532, 1534 coupled to the CL 1572, 1582, but also that I/O devices 1614 are also coupled to the control logic 1572, 1582. Legacy I/O devices 1615 are coupled to the chipset 1590.

Figure 17:
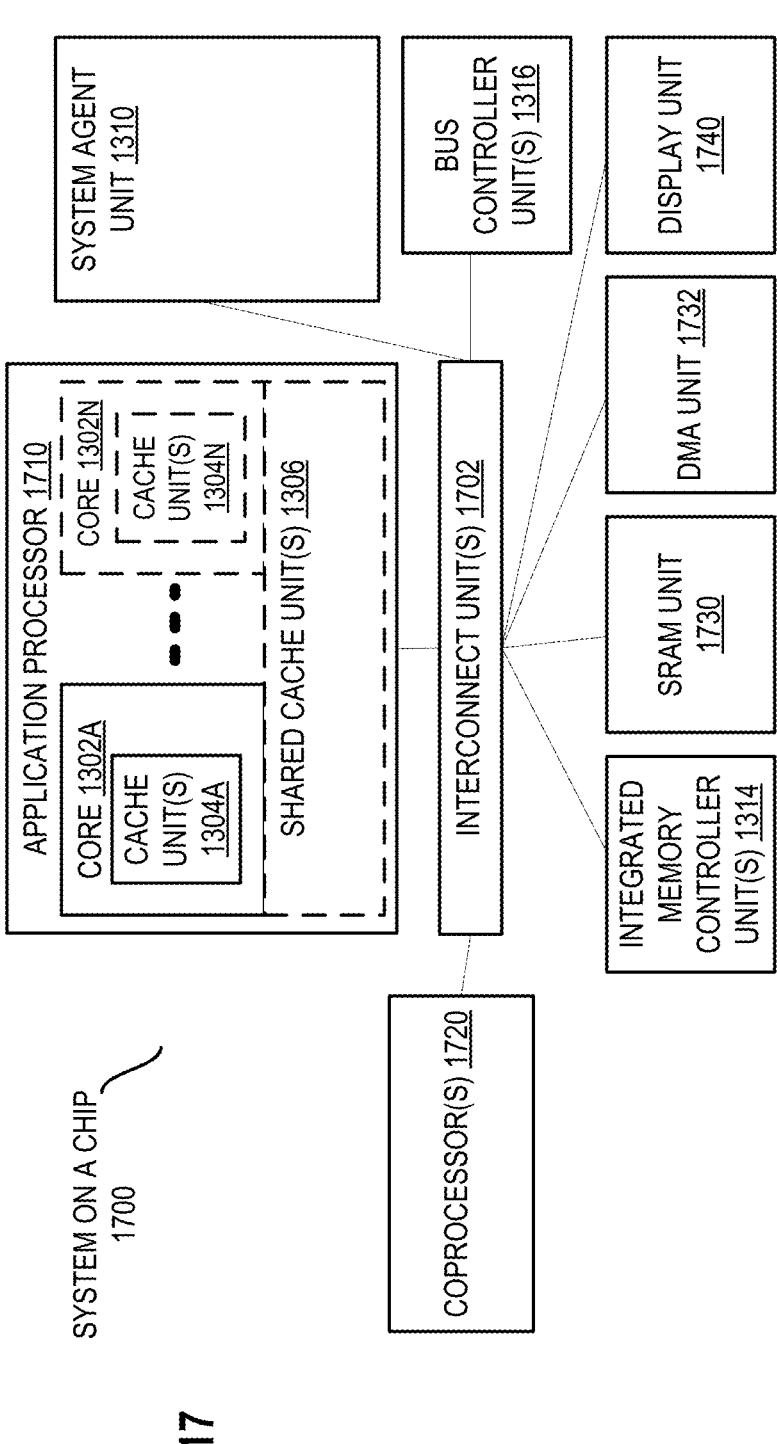
FIG. 17 is a block diagram of a SoC in accordance with an embodiment of the present invention.

Referring now to FIG. 17, shown is a block diagram of a SoC 1700 in accordance with an embodiment of the present invention. Similar elements in FIG. 13 bear like reference numerals. Also, dashed lined boxes are optional features on more advanced SoCs. In FIG. 17, an interconnect unit(s) 1702 is coupled to: an application processor 1710 which includes a set of one or more cores 1302A-N, which include cache units 1304A-N, and shared cache unit(s) 1306; a system agent unit 1310; a bus controller unit(s) 1316; an integrated memory controller unit(s) 1314; a set or one or more coprocessors 1720 which may include integrated graphics logic, an image processor, an audio processor, and a video processor; an static random access memory (SRAM) unit 1730; a direct memory access (DMA) unit 1732; and a display unit 1740 for coupling to one or more external displays. In one embodiment, the coprocessor(s) 1720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1530 illustrated in FIG. 15, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 18:
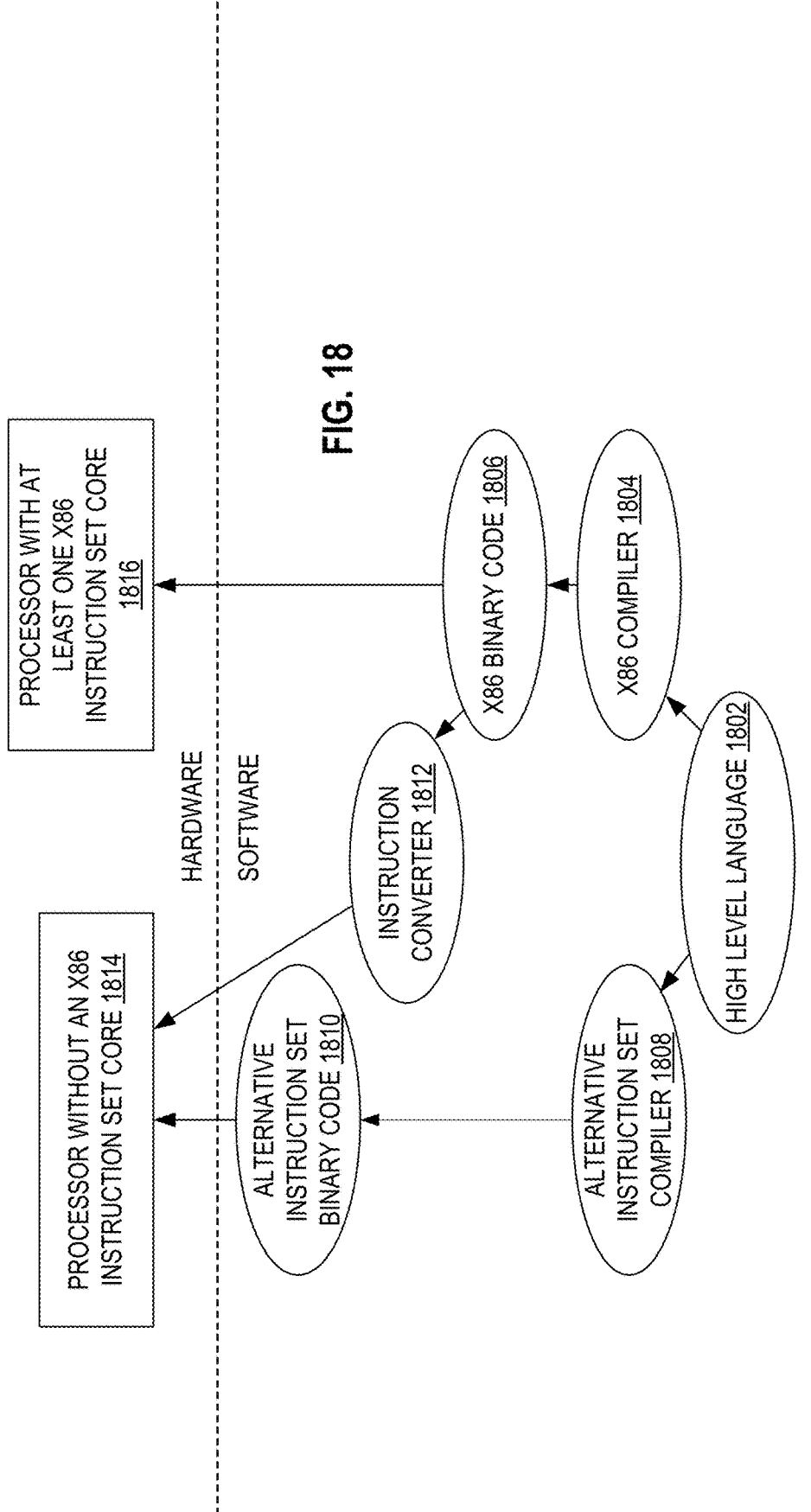
FIG. 18 is a block diagram contrasting the use of a software instruction converter to convert binary instructions in a source instruction set to binary instructions in a target instruction set according to embodiments of the invention.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806. Examples of various embodiments are detailed below.

Example 1: a processor comprising: decode circuitry to decode an instruction have fields for an opcode, an identifier of a first source bit matrix, an identifier of a second source bit matrix, an identifier of a destination bit matrix, and an immediate, and execution circuitry to execute the decoded instruction to perform a bit matrix multiplication of the identified first source bit matrix with the identified second source bit matrix, wherein the multiplication and accumulation operations are selected by the operation selector and store a result of the bit matrix multiplication into the identified destination bit matrix.

Example 2. The processor of example 1, wherein the operation selector is an 8-bit immediate.

Example 3. The processor of any of examples 1-2, wherein four bits of the immediate are used to select the accumulation operation of the group of exclusive OR (XOR), AND, OR, and NOR.

Example 4. The processor of any of examples 1-2, wherein four bits of the immediate are used to select the multiplication operation of the group of exclusive OR (XOR), AND, OR, and NOR.

Example 5. The processor of any of examples 1-4, wherein the identified first source matrix is an 8×8 bit matrix and the identified second source bit matrix is an 8×64 bit matrix.

Example 6. The processor of any of examples 1-4, wherein the identified first source matrix is an 64×8 bit matrix and the identified second source bit matrix is an 8×8 bit matrix.

Example 7. The processor of any of examples 1-4, wherein the identified first source matrix is an 8×64 bit matrix and the identified second source bit matrix is an 64×64 bit matrix.

Example 8. The processor of any of examples 1-7, wherein the identified second source bit matrix is stored in memory.

Example 9. The processor of any of examples 1-4, wherein the identified first source matrix is an 64×8 bit matrix and the identified second source bit matrix is an 64×8 bit matrix.

Example 10. The processor of any of examples 1-8, wherein the identified first source bit matrix is stored in memory.

Example 11. The processor of any of examples 1-10, wherein the bit matrix multiplication, comprises: for each bit position in the destination, multiply a value from each bit position of a corresponding row in the identified first source bit matrix by a value of corresponding S-bit position of a corresponding column in the identified second source bit matrix, accumulate each of the multiplications, and store a result of the accumulate.

Example 12. A processor comprising: decode circuitry to decode an instruction have fields for an opcode, an identifier of a first source bit matrix, an identifier of a second source bit matrix, an identifier of a destination bit matrix, and an immediate, and execution circuitry to execute the decoded instruction to perform a multiplication of a matrix of S-bit elements of the identified first source bit matrix with S-bit elements of the identified second source bit matrix, wherein the multiplication and accumulation operations are selected by the operation selector and store a result of the matrix multiplication into the identified destination bit matrix, wherein S indicates a plural bit size.

Example 13. The processor of example 12, wherein S indicates a bit size of 1, 2, 4, or 8.

Example 14. The processor of any of examples 12-13, wherein the operation selector is an 8-bit immediate.

Example 15. The processor of any of examples 12-14, wherein four bits of the immediate are used to select the accumulation operation of the group of exclusive OR (XOR), AND, OR, and NOR.

Example 16. The processor of any of examples 12-15, wherein four bits of the immediate are used to select the multiplication operation of the group of exclusive OR (XOR), AND, OR, and NOR.

Example 17. The processor of any of examples 12-16, wherein the identified first source matrix is an 8×8 bit matrix and the identified second source bit matrix is an 8×64 bit matrix.

Example 18. The processor of any of examples 12-16, wherein the identified first source matrix is an 64×8 bit matrix and the identified second source bit matrix is an 8×8 bit matrix.

Example 19. The processor of any of examples 12-16, wherein the identified first source matrix is an 8×64 bit matrix and the identified second source bit matrix is an 64×64 bit matrix.

Example 20. The processor of any of examples 12-19, wherein the identified second source bit matrix is stored in memory.

Example 21. The processor of any of examples 12-16, wherein the identified first source matrix is an 64×8 bit matrix and the identified second source bit matrix is an 64×8 bit matrix.

Example 22. The processor of any of examples 12-21, wherein the identified first source bit matrix is stored in memory.

Example 23. The processor of any of examples 12-22, wherein the bit matrix multiplication, comprises: for each S-bit position group in the destination, multiply a S-bit group value each S-bit position group of a corresponding row in the identified first source bit matrix by a value of corresponding S-bit position group of a corresponding column in the identified second source bit matrix, accumulate each of the multiplications, and store a result of the accumulate.

Example 24. A method comprising:
decoding an instruction have fields for an opcode, an identifier of a first source bit matrix, an identifier of a second source bit matrix, an identifier of a destination bit matrix, and an immediate; and executing the decoded instruction to perform a multiplication of a matrix of S-bit elements of the identified first source bit matrix with S-bit elements of the identified second source bit matrix, wherein the multiplication and accumulation operations are selected by the operation selector and store a result of the matrix multiplication into the identified destination bit matrix, wherein S indicates a plural bit size.

Example 25. The method of example 24, wherein S indicates a bit size of 1, 2, 4, or 8.

Example 26. The method of any of examples 24-25, wherein the operation selector is an 8-bit immediate.

Example 27. The method of any of examples 24-26, wherein four bits of the immediate are used to select the accumulation operation of the group of exclusive OR (XOR), AND, OR, and NOR.

Example 28. The method of any of examples 24-27, wherein four bits of the immediate are used to select the multiplication operation of the group of exclusive OR (XOR), AND, OR, and NOR.

Example 29. The method of any of examples 24-28, wherein the identified first source matrix is an 8×8 bit matrix and the identified second source bit matrix is an 8×64 bit matrix.

Example 30. The method of any of examples 24-28, wherein the identified first source matrix is an 64×8 bit matrix and the identified second source bit matrix is an 8×8 bit matrix.

Example 31. The method of any of examples 24-28, wherein the identified first source matrix is an 8×64 bit matrix and the identified second source bit matrix is an 64×64 bit matrix.

Example 32. The method of any of examples 24-31, wherein the identified second source bit matrix is stored in memory.

Example 33. The method of any of examples 24-27, wherein the identified first source matrix is an 64×8 bit matrix and the identified second source bit matrix is an 64×8 bit matrix.

Example 34. The method of any of examples 24-33, wherein the identified first source bit matrix is stored in memory.

Example 35. The method of any of examples 24-34, wherein the bit matrix multiplication, comprises: for each S-bit position group in the destination, multiply a S-bit group value each S-bit position group of a corresponding row in the identified first source bit matrix by a value of corresponding S-bit position group of a corresponding column in the identified second source bit matrix, accumulate each of the multiplications, and store a result of the accumulate.

Example 36. A non-transitory machine-readable medium storing an instruction which when executed by a processor is to cause the processor to perform a method, the comprising: decoding an instruction have fields for an opcode, an identifier of a first source bit matrix, an identifier of a second source bit matrix, an identifier of a destination bit matrix, and an immediate; and executing the decoded instruction to perform a multiplication of a matrix of S-bit elements of the identified first source bit matrix with S-bit elements of the identified second source bit matrix, wherein the multiplication and accumulation operations are selected by the operation selector and store a result of the matrix multiplication into the identified destination bit matrix, wherein S indicates a plural bit size.

Example 37. The non-transitory machine-readable medium of example 36, wherein S indicates a bit size of 1, 2, 4, or 8.

Example 38. The non-transitory machine-readable medium of any of examples 36-37, wherein the operation selector is an 8-bit immediate.

Example 39. The non-transitory machine-readable medium of any of examples 36-38, wherein four bits of the immediate are used to select the accumulation operation of the group of exclusive OR (XOR), AND, OR, and NOR.

Example 40. The non-transitory machine-readable medium of any of examples 36-39, wherein four bits of the immediate are used to select the multiplication operation of the group of exclusive OR (XOR), AND, OR, and NOR.

Example 41. The non-transitory machine-readable medium of any of examples 36-40, wherein the identified first source matrix is an 8×8 bit matrix and the identified second source bit matrix is an 8×64 bit matrix.

Example 42. The non-transitory machine-readable medium of any of examples 36-40, wherein the identified first source matrix is an 64×8 bit matrix and the identified second source bit matrix is an 8×8 bit matrix.

Example 43. The non-transitory machine-readable medium of any of examples 36-40, wherein the identified first source matrix is an 8×64 bit matrix and the identified second source bit matrix is an 64×64 bit matrix.

Example 44. The non-transitory machine-readable medium of any of examples 36-40, wherein the identified second source bit matrix is stored in memory.

Example 45. The non-transitory machine-readable medium of any of examples 36-40, wherein the identified first source matrix is an 64×8 bit matrix and the identified second source bit matrix is an 64×8 bit matrix.

Example 46. The non-transitory machine-readable medium of any of examples 36-45, wherein the identified first source bit matrix is stored in memory.

Example 47. The non-transitory machine-readable medium of any of examples 36-46, wherein the bit matrix multiplication, comprises: for each S-bit position group in the destination, multiply a S-bit group value each S-bit position group of a corresponding row in the identified first source bit matrix by a value of corresponding S-bit position group of a corresponding column in the identified second source bit matrix, accumulate each of the multiplications, and store a result of the accumulate.

Example 48. An apparatus comprising: decode means for decoding an instruction have fields for an opcode, an identifier of a first source bit matrix, an identifier of a second source bit matrix, an identifier of a destination bit matrix, and an immediate; execution means for executing the decoded instruction to perform a multiplication of a matrix of S-bit elements of the identified first source bit matrix with S-bit elements of the identified second source bit matrix, wherein the multiplication and accumulation operations are selected by the operation selector and store a result of the matrix multiplication into the identified destination bit matrix, wherein S indicates a plural bit size.

Example 49. The apparatus of example 48, wherein S indicates a bit size of 1, 2, 4, or 8.

Example 50. The apparatus of any of examples 48-49, wherein the operation selector is an 8-bit immediate.

Example 51. The apparatus of any of examples 48-50, wherein four bits of the immediate are used to select the accumulation operation of the group of exclusive OR (XOR), AND, OR, and NOR.

Example 52. The apparatus of any of examples 48-51, wherein four bits of the immediate are used to select the multiplication operation of the group of exclusive OR (XOR), AND, OR, and NOR.

Example 53. The apparatus of any of examples 48-52, wherein the identified first source matrix is an 8×8 bit matrix and the identified second source bit matrix is an 8×64 bit matrix.

Example 54. The apparatus of any of examples 48-52, wherein the identified first source matrix is an 64×8 bit matrix and the identified second source bit matrix is an 8×8 bit matrix.

Example 55. The apparatus of any of examples 48-52, wherein the identified first source matrix is an 8×64 bit matrix and the identified second source bit matrix is an 64×64 bit matrix.

Example 56. The apparatus of any of examples 48-55, wherein the identified second source bit matrix is stored in memory.

Example 57. The apparatus of any of examples 48-52, wherein the identified first source matrix is an 64×8 bit matrix and the identified second source bit matrix is an 64×8 bit matrix.

Example 58. The apparatus of any of examples 48-57, wherein the identified first source bit matrix is stored in memory.

Example 59. The apparatus of any of examples 48-58, wherein the bit matrix multiplication, comprises: for each S-bit position group in the destination, multiply a S-bit group value each S-bit position group of a corresponding row in the identified first source bit matrix by a value of corresponding S-bit position group of a corresponding column in the identified second source bit matrix, accumulate each of the multiplications, and store a result of the accumulate.

What is claimed is:

1. A processor comprising:
   decode circuitry to decode an instruction having fields for an opcode, an identifier of a first multi-dimensional source bit matrix, an identifier of a second multi-dimensional source bit matrix, an identifier of a destination multi-dimensional bit matrix, and an operation selector; and
   execution circuitry to execute the decoded instruction to perform a bit matrix multiplication and accumulation using the identified first multi-dimensional source bit matrix and the identified second multi-dimensional source bit matrix, wherein the multiplication and accumulation operations are selected by the operation selector and store a result of the bit matrix multiplication into the identified destination multi-dimensional bit matrix.

2. The processor of claim 1, wherein the operation selector is an immediate.

3. The processor of claim 2, wherein bits of the immediate are used to select the accumulation operation of a group of exclusive OR (XOR), AND, OR, and NOR.

4. The processor of claim 2, wherein bits of the immediate are used to select the multiplication operation of a group of exclusive OR (XOR), AND, OR, and NOR.

5. The processor of claim 1, wherein the identified first multi-dimensional source matrix is an 8×8 bit matrix and the identified second multi-dimensional source bit matrix is an 8×64 bit matrix.

6. The processor of claim 1, wherein the identified first multi-dimensional source matrix is a 64×8 bit matrix and the identified second multi-dimensional source bit matrix is an 8×8 bit matrix.

7. The processor of claim 1, wherein the identified first multi-dimensional source matrix is an 8×64 bit matrix and the identified second multi-dimensional source bit matrix is a 64×64 bit matrix.

8. The processor of claim 1, wherein the identified second multi-dimensional source bit matrix is to be stored in memory.

9. The processor of claim 1, wherein the identified first multi-dimensional source matrix is a 64×8 bit matrix and the identified second multi-dimensional source bit matrix is a 64×8 bit matrix.

10. The processor of claim 1, wherein the identified first multi-dimensional source bit matrix is to be stored in memory.

11. The processor of claim 1, wherein the bit matrix multiplication and accumulation, comprises for each bit position in the destination, to multiply a value from each bit position of a corresponding row in the identified first multi-dimensional source bit matrix by a value of corresponding bit position of a corresponding column in the identified second multi-dimensional source bit matrix, accumulate each of the multiplications, and store a result of the accumulate.

12. A processor comprising:

decode circuitry to decode an instruction having fields for an opcode, an identifier of a first multi-dimensional source matrix, an identifier of a second multi-dimensional source matrix, an identifier of a multi-dimensional destination matrix, and an operation selector; and execution circuitry to execute the decoded instruction to perform a multiplication and accumulation using a matrix of S-bit elements of the identified first multi-dimensional source matrix and S-bit elements of the identified second multi-dimensional source matrix, wherein the multiplication and accumulation operations are selected by the operation selector and store a result of the matrix multiplication into the identified multi-dimensional destination matrix, wherein S indicates a plural bit size.

13. The processor of claim 12, wherein S indicates a bit size of 1, 2, 4, or 8.

14. The processor of claim 12, wherein the operation selector is an immediate.

15. The processor of claim 14, wherein bits of the immediate are used to select the accumulation operation of a group of exclusive OR (XOR), AND, OR, and NOR.

16. The processor of claim 14, wherein bits of the immediate are used to select the multiplication operation of a group of exclusive OR (XOR), AND, OR, and NOR.

17. The processor of claim 12, wherein the identified first multi-dimensional source matrix is an 8×8 bit matrix and the identified second multi-dimensional source matrix is an 8×64 bit matrix.

18. The processor of claim 12, wherein the identified first multi-dimensional source matrix is a 64×8 bit matrix and the identified second multi-dimensional source matrix is an 8×8 bit matrix.

19. The processor of claim 12, wherein the identified first multi-dimensional source matrix is an 8×64 bit matrix and the identified second multi-dimensional source matrix is a 64×64 bit matrix.

20. The processor of claim 12, wherein the identified second multi-dimensional source matrix is stored in memory.

21. The processor of claim 12, wherein the identified first multi-dimensional source matrix is a 64×8 bit matrix and the identified second multi-dimensional source bit matrix is a 64×8 bit matrix.

22. The processor of claim 12, wherein the identified first multi-dimensional source matrix is stored in memory.

23. The processor of claim 12, wherein the matrix multiplication and accumulation, comprises: for each S-bit position group in the destination, to multiply a S-bit group value of each S-bit position group of a corresponding row in the identified first multi-dimensional source matrix by a value of corresponding S-bit position group of a corresponding column in the identified second multi-dimensional source matrix, accumulate each of the multiplications, and store a result of the accumulate.

*   *   *   *   *